United States Patent
Yamasaki

(10) Patent No.: US 9,696,525 B2
(45) Date of Patent: Jul. 4, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/190,057

(22) Filed: Jun. 22, 2016

(65) Prior Publication Data

US 2017/0003481 A1  Jan. 5, 2017

(30) Foreign Application Priority Data

Jun. 30, 2015 (JP) ................. 2015-132146

(51) Int. Cl.
| | |
|---|---|
| G02B 15/14 | (2006.01) |
| G02B 13/00 | (2006.01) |
| G02B 7/04 | (2006.01) |
| G02B 27/00 | (2006.01) |
| G02B 9/64 | (2006.01) |
| H04N 5/232 | (2006.01) |

(52) U.S. Cl.
CPC ............ *G02B 13/009* (2013.01); *G02B 7/04* (2013.01); *G02B 9/64* (2013.01); *G02B 27/0025* (2013.01); *H04N 5/23296* (2013.01)

(58) Field of Classification Search
CPC ....................................... G02B 15/20
USPC ....................................... 359/684
See application file for complete search history.

(56) References Cited

U.S. PATENT DOCUMENTS

2015/0253551 A1* 9/2015 Obama ............... G02B 15/173
359/557

FOREIGN PATENT DOCUMENTS

JP   2005-055625 A   3/2005

\* cited by examiner

*Primary Examiner* — James Jones
(74) *Attorney, Agent, or Firm* — Canon USA, Inc. I.P. Division

(57) ABSTRACT

In a zoom lens including a first lens unit having a positive refractive power, a second lens unit having a negative refractive power, a third lens unit having a positive refractive power, and a fourth lens unit having a positive refractive power that are arranged in order from an object side to an image side, a movement locus of each of the lens units when zooming, a configuration of the second lens unit, a focal length of the second lens unit, a focal length of the third lens unit, and a focal length of the zoom lens at the wide angle end are set as appropriate.

12 Claims, 17 Drawing Sheets

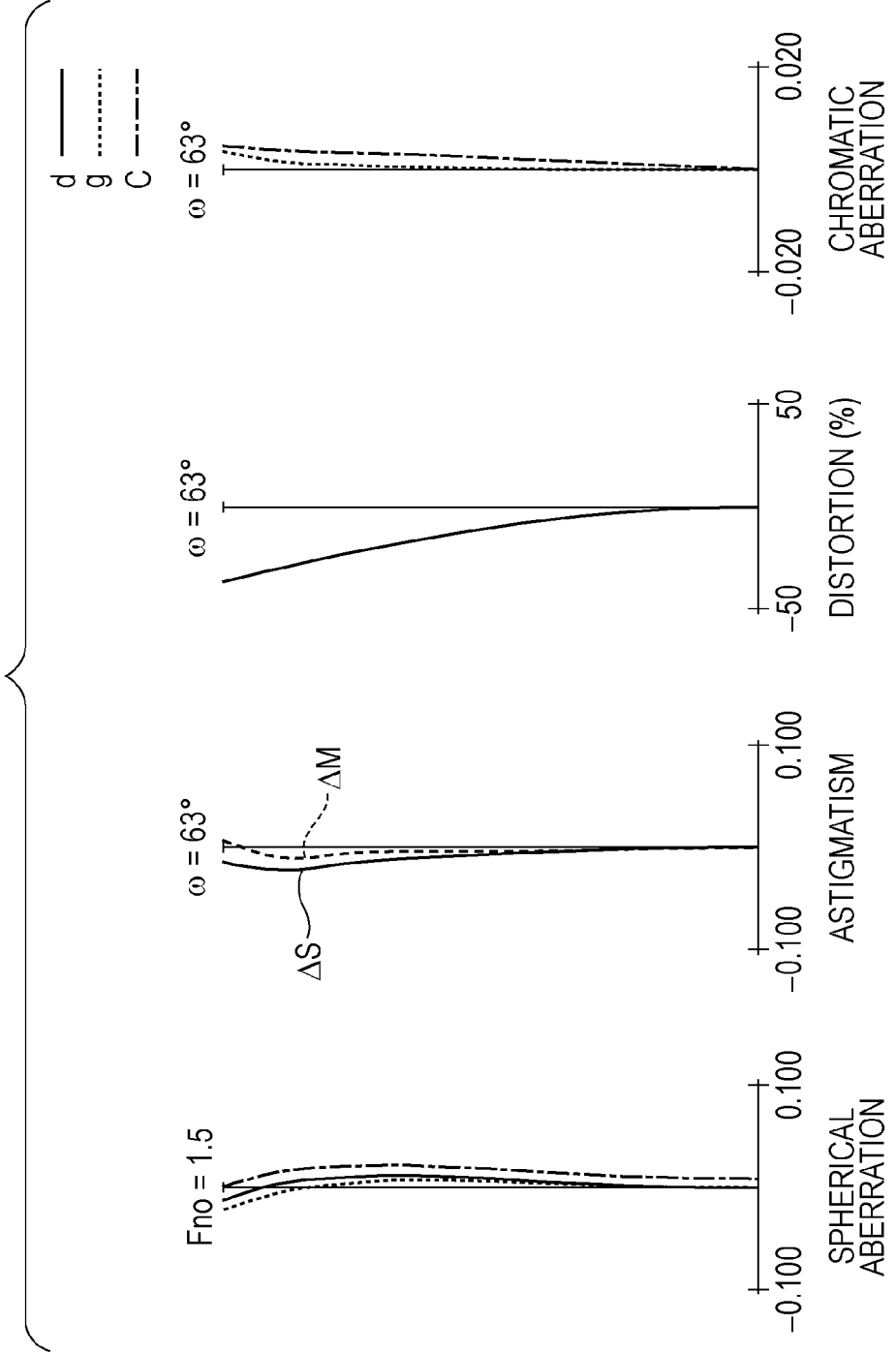

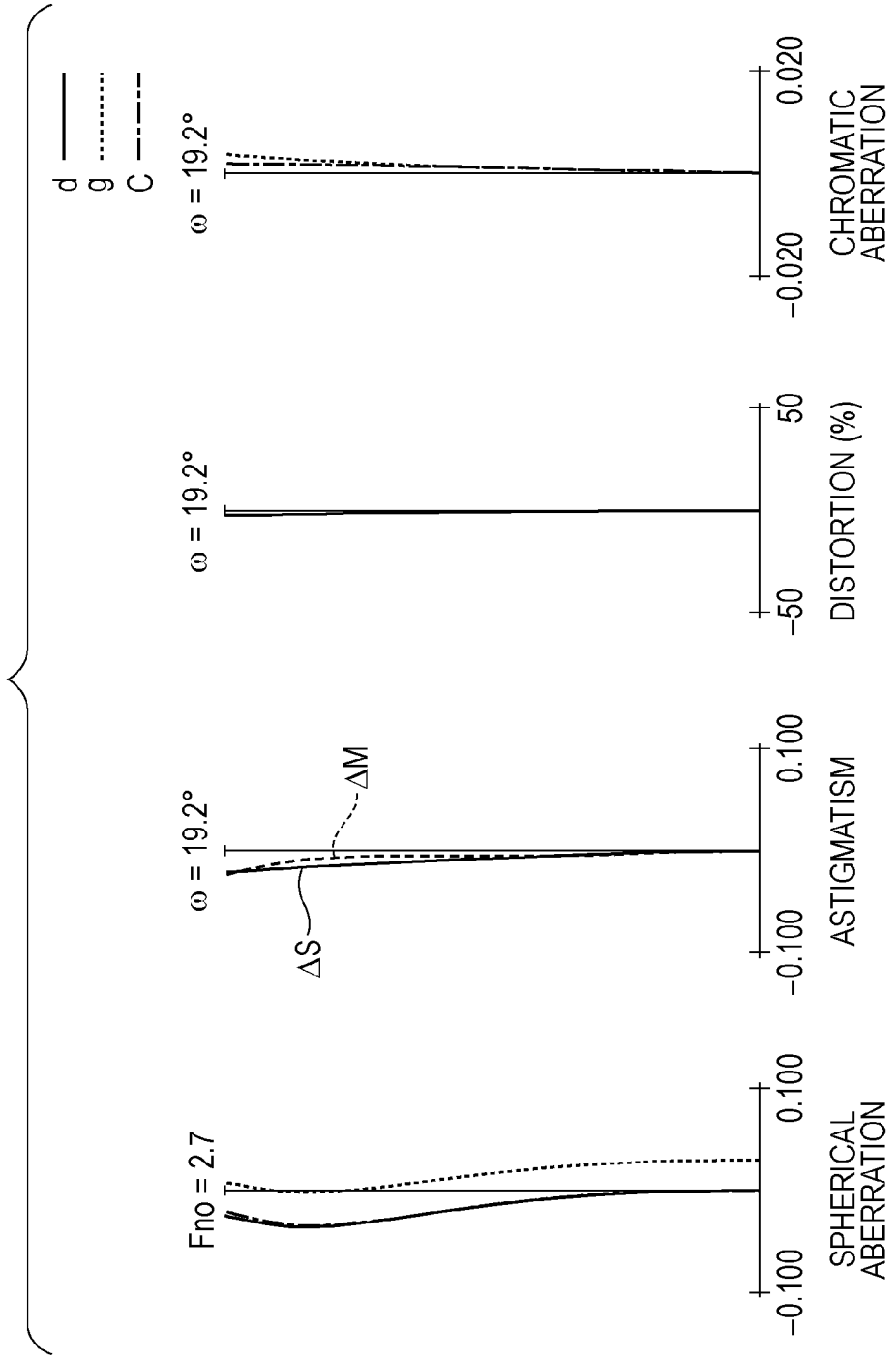

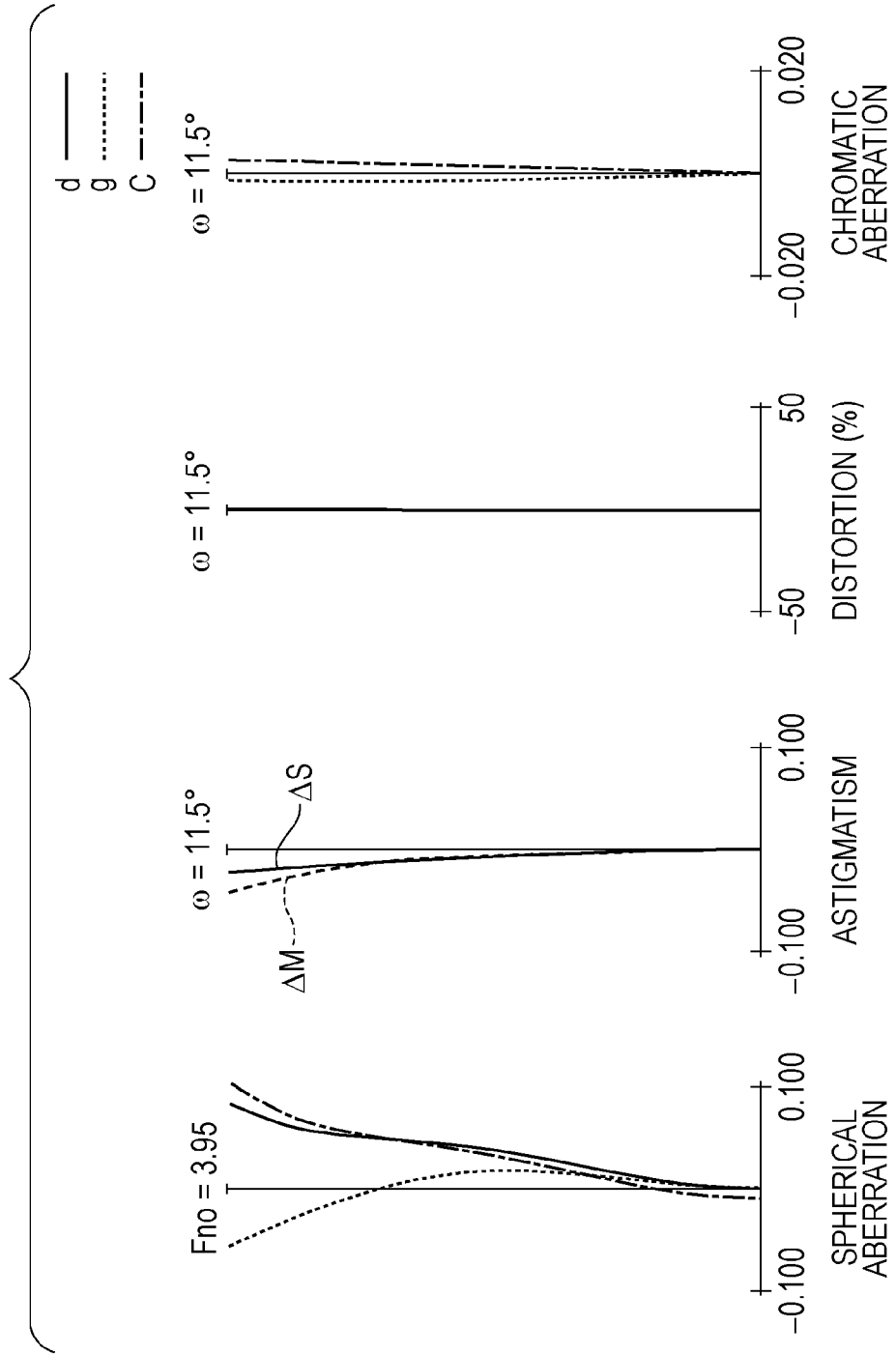

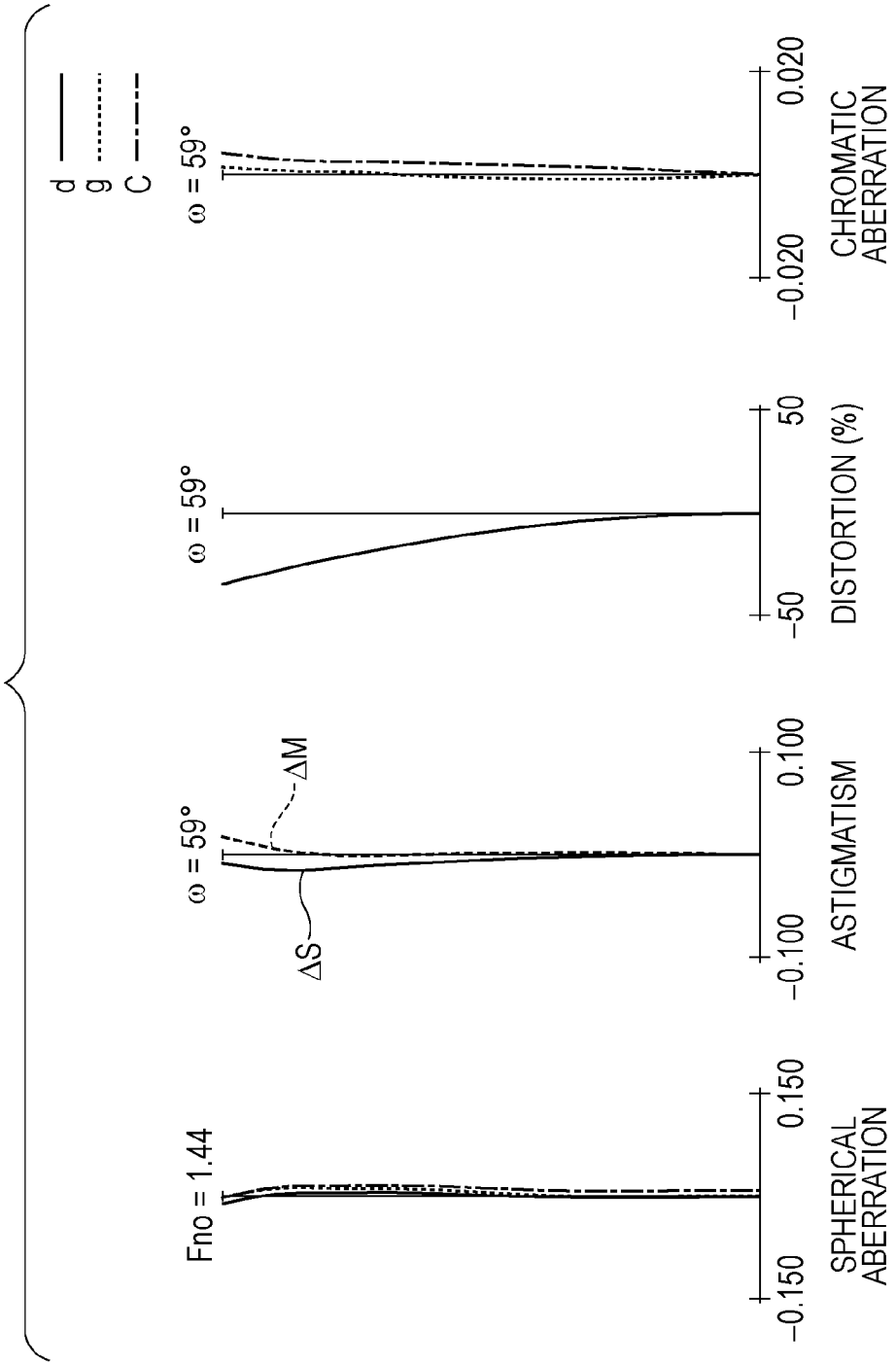

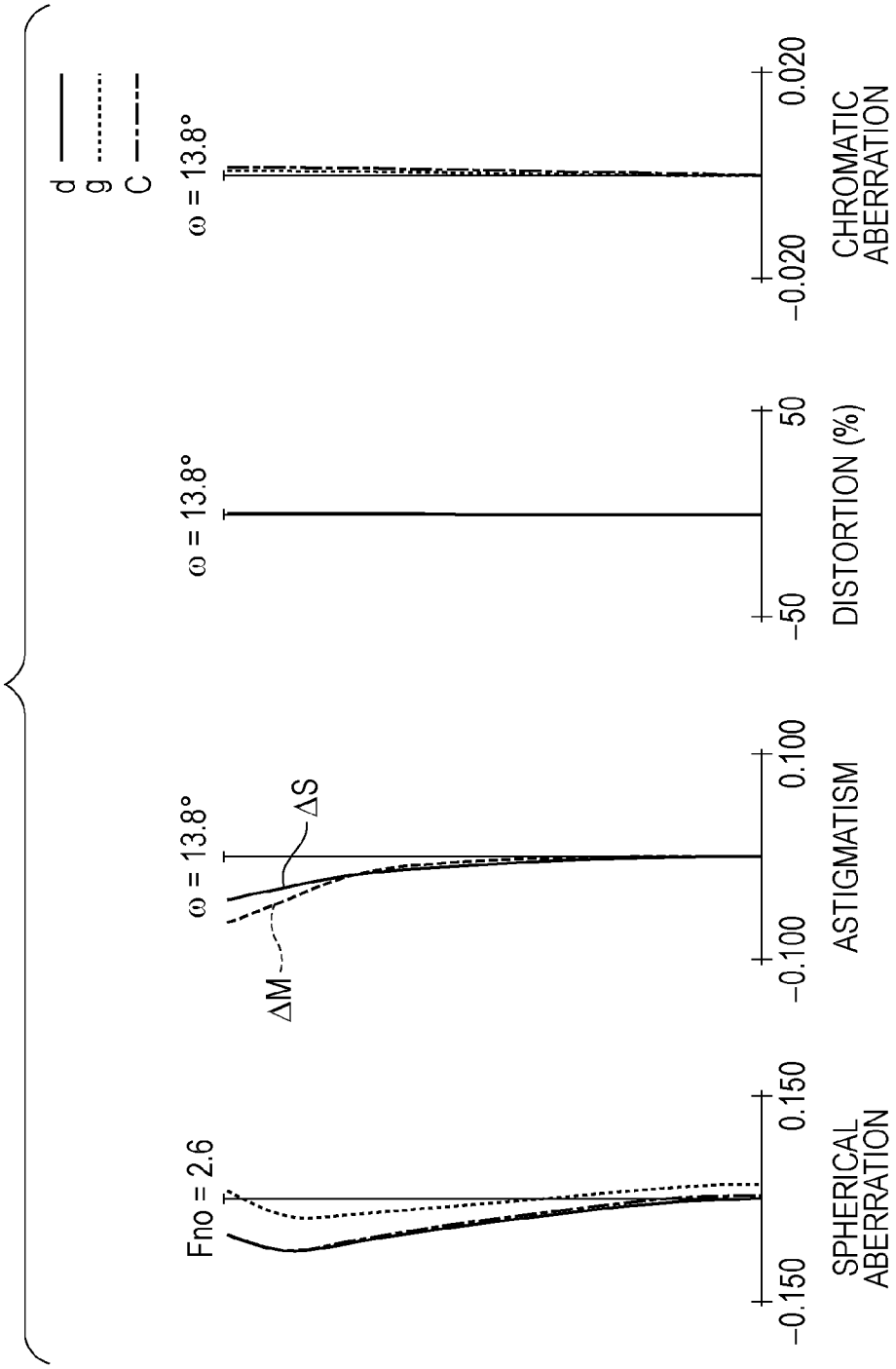

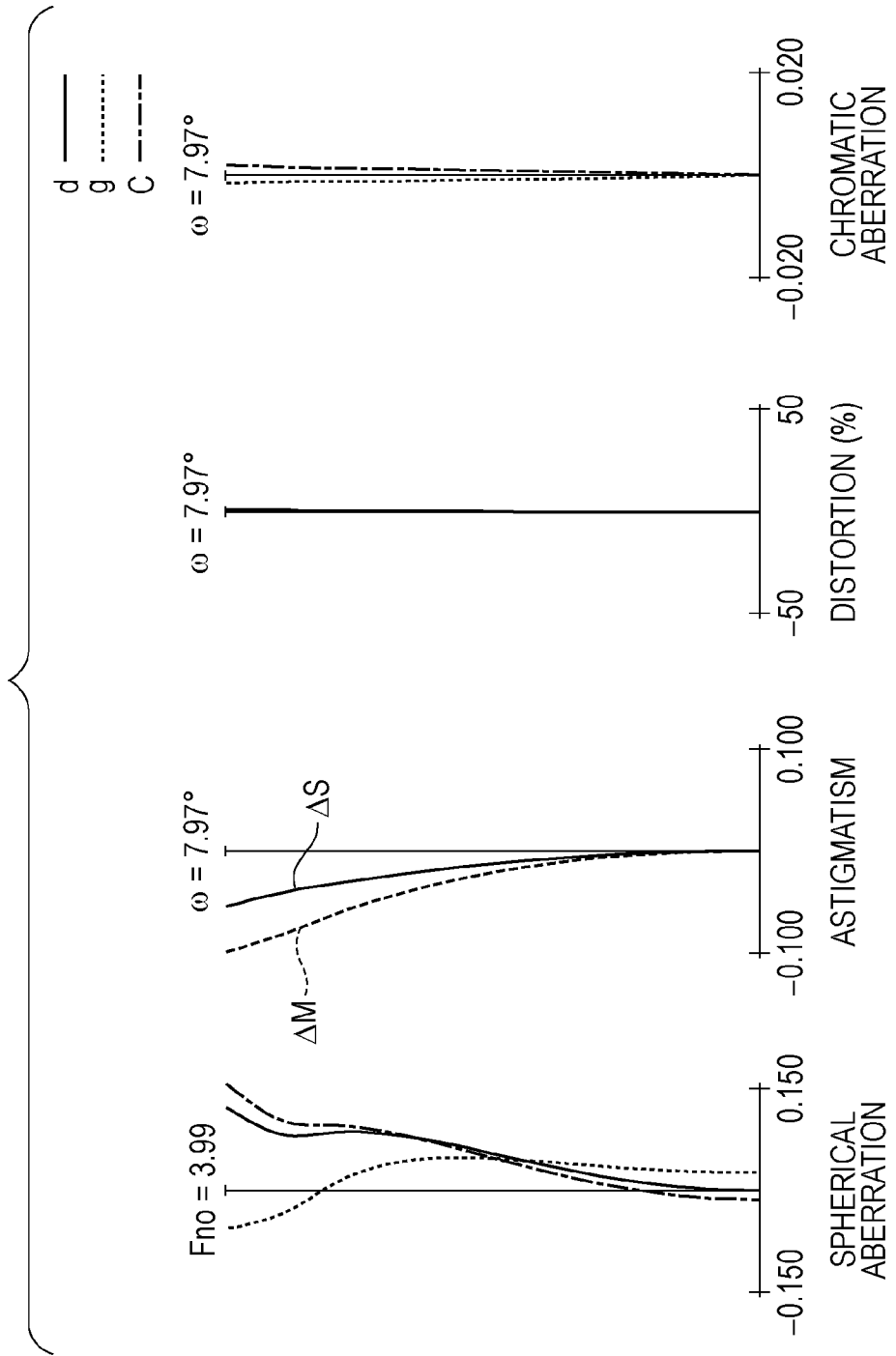

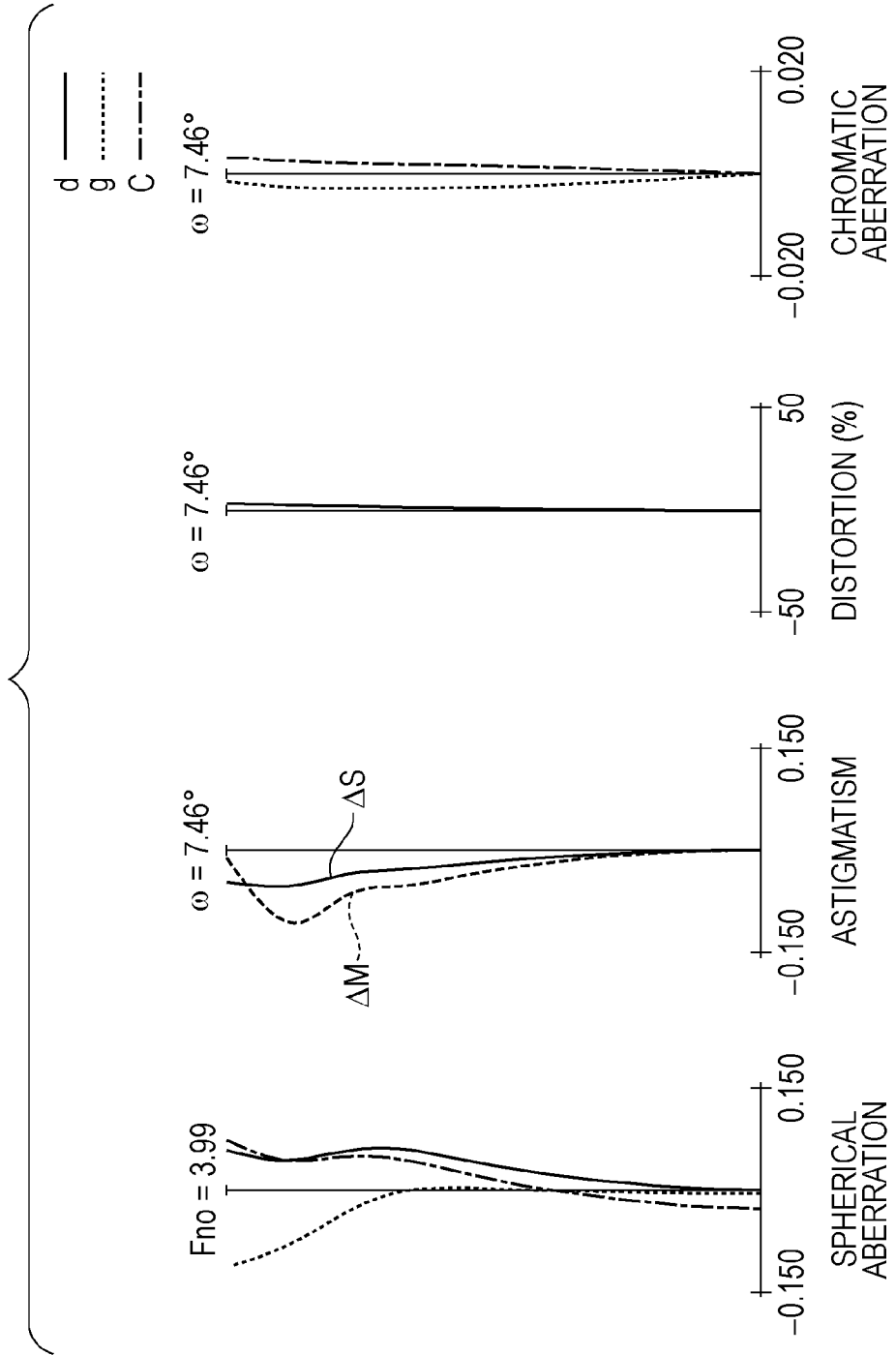

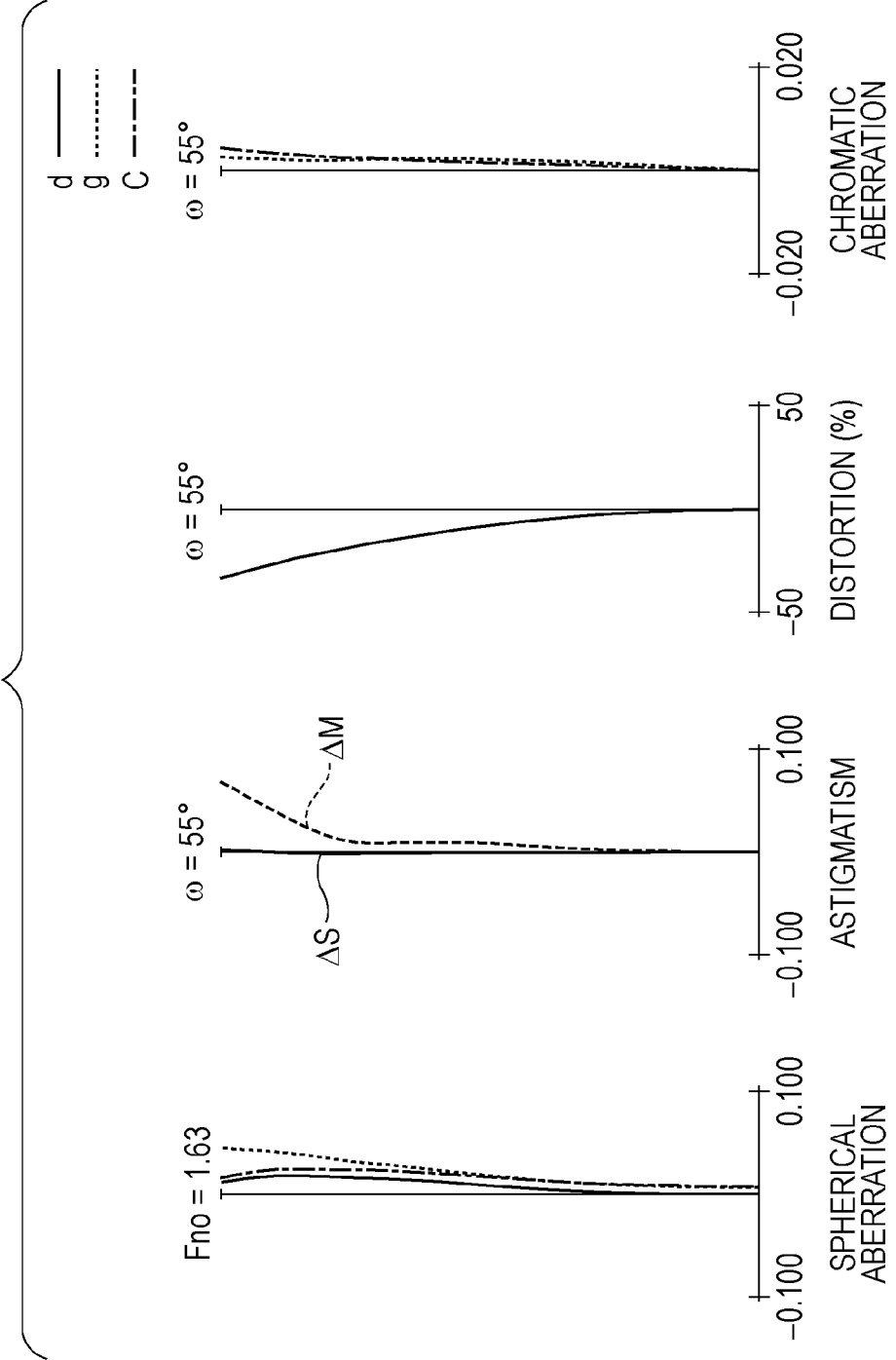

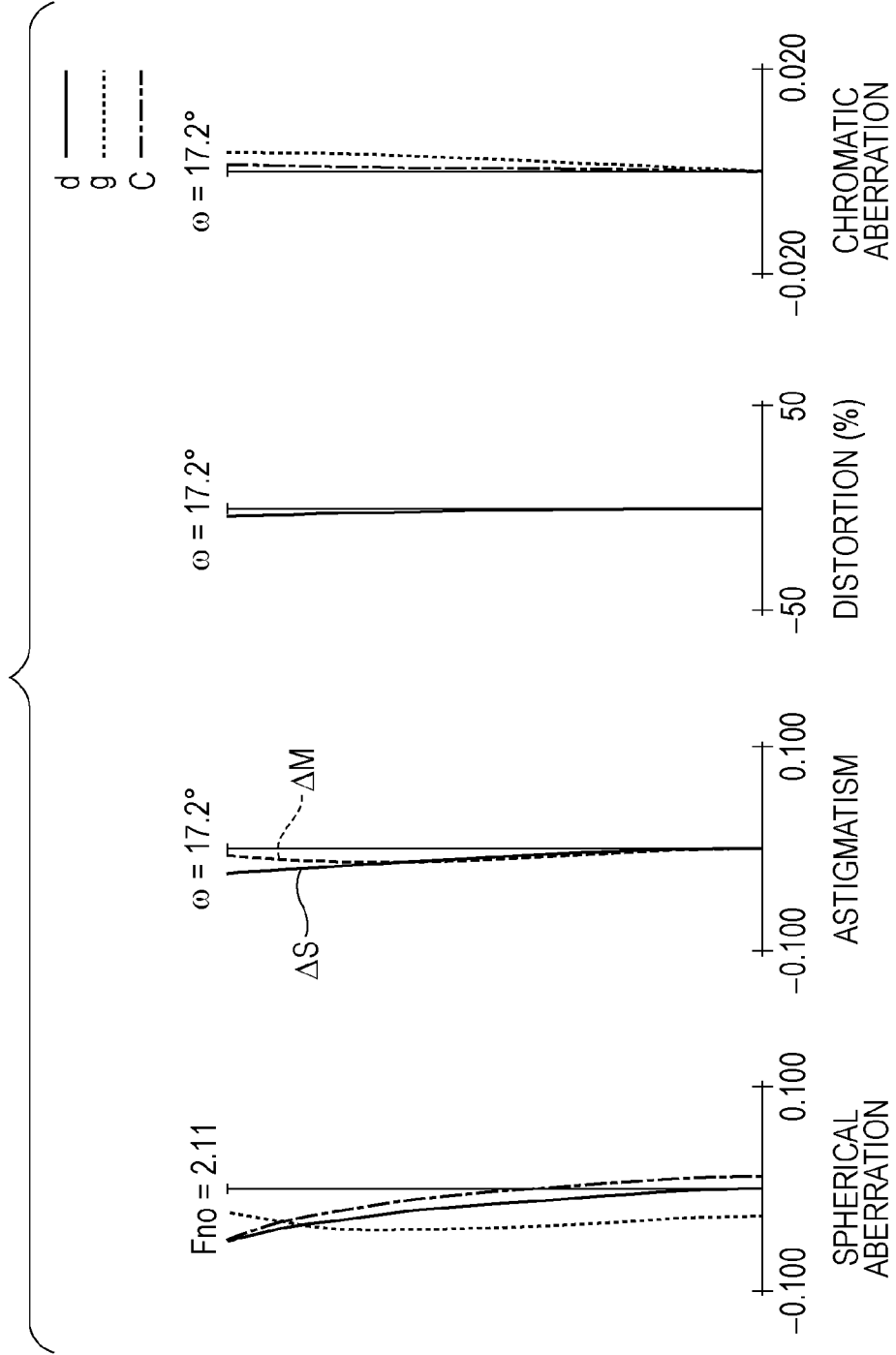

ZOOM LENS AND IMAGE PICKUP APPARATUS INCLUDING THE SAME

BACKGROUND OF THE INVENTION

Field of the Invention

The present disclosure relates to a zoom lens and an image pickup apparatus including the zoom lens. For example, the present disclosure is suitable for an image pickup apparatus, such as a digital still camera, a video camera, a monitoring camera, or a broadcasting camera, that includes an image pickup element or suitable for an image pickup apparatus, such as a camera in which a silver-halide photography film is used.

Description of the Related Art

In recent years, an image pickup apparatus, such as a monitoring camera or a video camera, that includes a solid-state image pickup element has had improved functionality, and the overall size of the apparatus has been reduced. There is a demand that a zoom lens used in such an apparatus be small, have a high zoom ratio, and have good optical characteristics. There is also a demand that a zoom lens have a wider angle of view in order to enable imaging of a broader range with a single image pickup apparatus.

In order to meet such demands, a zoom lens that includes lens units having positive, negative, positive, positive, and positive refractive powers that are arranged in order from an object side to an image side is known.

Japanese Patent Laid-Open No. 2005-55625 discloses a zoom lens that has achieved a wider angle of view while reducing distortion aberration or astigmatism by disposing a negative lens having a concave surface in a second lens unit on a side closest to the object side.

However, in the zoom lens disclosed in Japanese Patent Laid-Open No. 2005-55625, the magnification varying burdens of the second lens unit, a third lens unit, and a fourth lens unit are relatively small, and thus it is difficult to achieve a high power and a wide angle of view at a sufficient level.

SUMMARY OF THE INVENTION

The present disclosure provides a zoom lens including a first lens unit having a positive refractive power, a second lens unit having a negative refractive power, a third lens unit having a positive refractive power, and a fourth lens unit having a positive refractive power that are arranged in order from an object side to an image side. A distance between adjacent lens units changes when zooming. When zooming, the first lens unit is stationary. When zooming from a wide angle end to a telephoto end, the second lens unit is configured to move toward the image side and then to move toward the object side, and the third lens unit is configured to move monotonously toward the object side. The second lens unit includes two or more negative lenses. When a focal length of the second lens unit is represented by f2, a focal length of the third lens unit is represented by f3, and a focal length of the zoom lens at the wide angle end is represented by fw, conditional expressions $-1.05 < f2/f3 < -0.30$ and $-5.00 < f2/fw < -2.50$ are satisfied.

According to other aspects of the present disclosure, one or more additional zoom lenses, one or more image pickup apparatuses and one or more methods for use with same are discussed herein. Further features of the present disclosure will become apparent from the following description of exemplary embodiments with reference to the attached drawings.

BRIEF DESCRIPTION OF THE DRAWINGS

FIGS. 2A, 2B, and 2C are aberration diagrams, respectively, at a wide angle end, an intermediate zoom position, and a telephoto end of the zoom lens according to the first exemplary embodiment.

FIGS. 4A, 4B, and 4C are aberration diagrams, respectively, at a wide angle end, an intermediate zoom position, and a telephoto end of the zoom lens according to the second exemplary embodiment.

FIGS. 6A, 6B, and 6C are aberration diagrams, respectively, at a wide angle end, an intermediate zoom position, and a telephoto end of the zoom lens according to the third exemplary embodiment.

FIGS. 8A, 8B, and 8C are aberration diagrams, respectively, at a wide angle end, an intermediate zoom position, and a telephoto end of the zoom lens according to the fourth exemplary embodiment.

DESCRIPTION OF THE EMBODIMENTS

Hereinafter, a zoom lens and an image pickup apparatus including the zoom lens according to exemplary embodiments of the present disclosure will be described in detail with reference to the appended drawings. A zoom lens according to an exemplary embodiment of the present disclosure includes a first lens unit having a positive refractive power, a second lens unit having a negative refractive power, a third lens unit having a positive refractive power, and a fourth lens unit having a positive refractive power, and the first through fourth lens units are arranged in order from an object side to an image side. Herein, a lens unit corresponds to a lens element that integrally moves when zooming. Each lens unit may include at least one lens and does not have to include a plurality of lenses.

Figure 1:
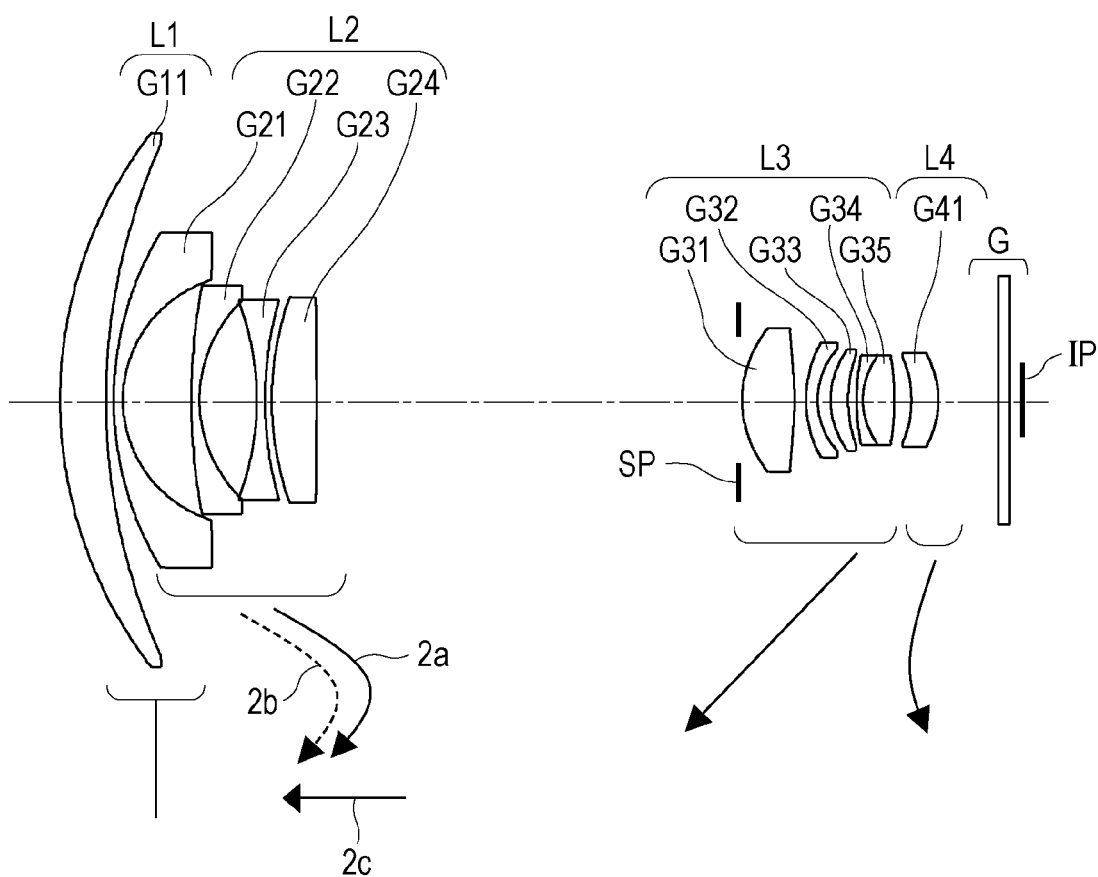
FIG. 1 is a lens sectional view at a wide angle end of a zoom lens according to a first exemplary embodiment.
Figure 3:
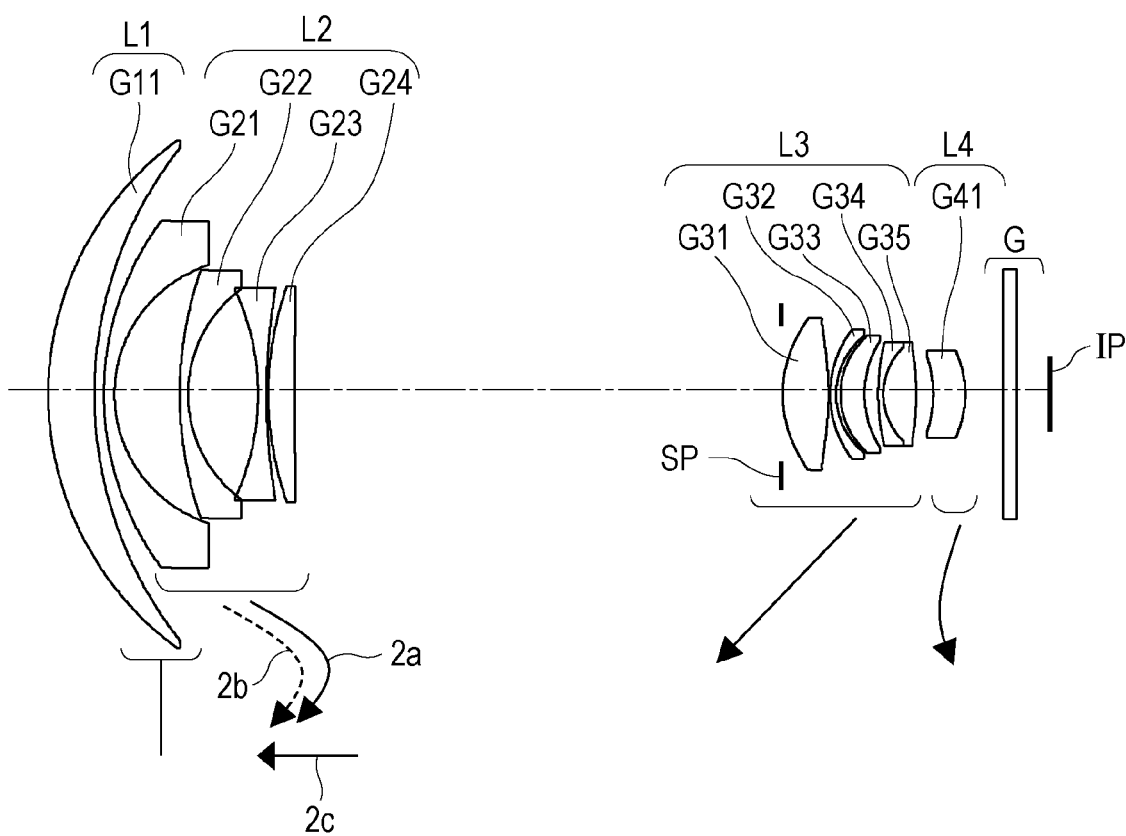
FIG. 3 is a lens sectional view at a wide angle end of a zoom lens according to a second exemplary embodiment.

FIG. 1 is a lens sectional view at a wide angle end of a zoom lens according to a first exemplary embodiment. FIGS. 2A, 2B, and 2C are aberration diagrams, respectively, at a wide angle end, an intermediate zoom position, and a telephoto end of the zoom lens according to the first exemplary embodiment. The first exemplary embodiment provides a zoom lens having a zoom ratio of 6.0 and an F-number of approximately 1.50 to 3.95. FIG. 3 is a lens sectional view at a wide angle end of a zoom lens according to a second exemplary embodiment. FIGS. 4A, 4B, and 4C are aberration diagrams, respectively, at a wide angle end, an intermediate zoom position, and a telephoto end of the zoom lens according to the second exemplary embodiment. The second exemplary embodiment provides a zoom lens having a zoom ratio of 7.7 and an F-number of approximately 1.44 to 3.99.

Figure 5:
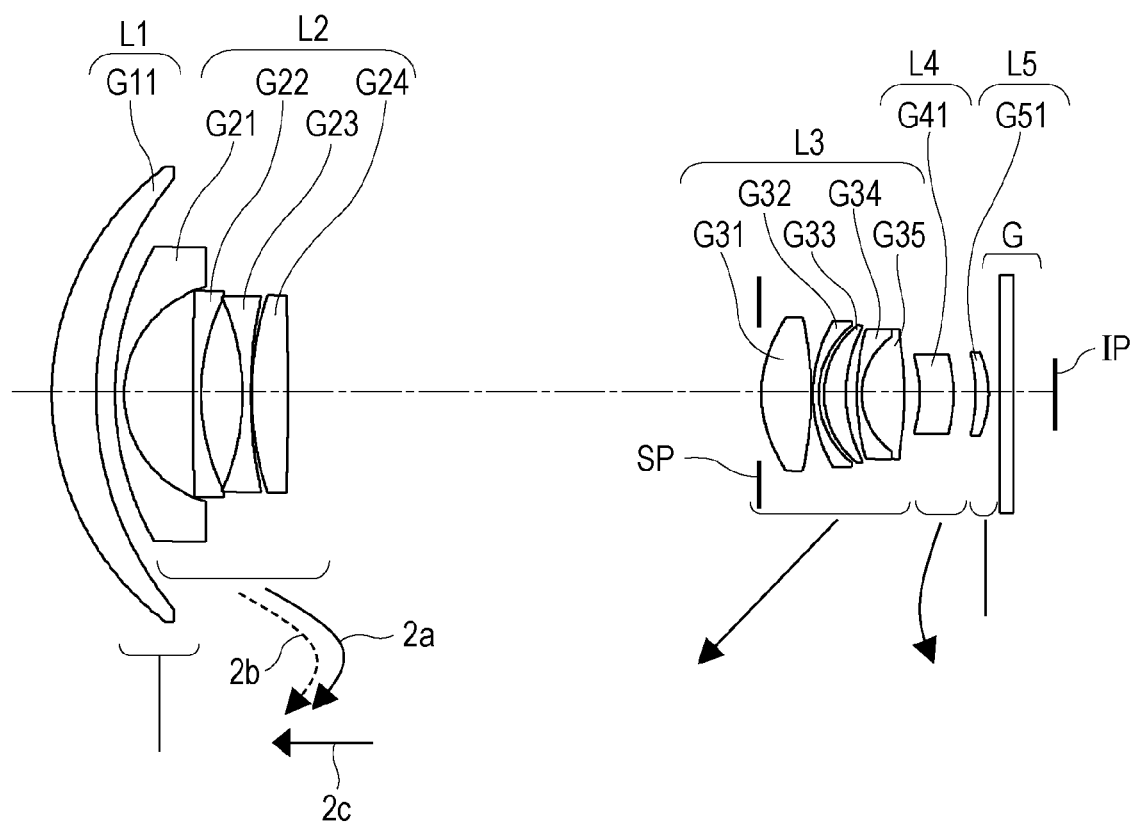
FIG. 5 is a lens sectional view at a wide angle end of a zoom lens according to a third exemplary embodiment.
Figure 6A:
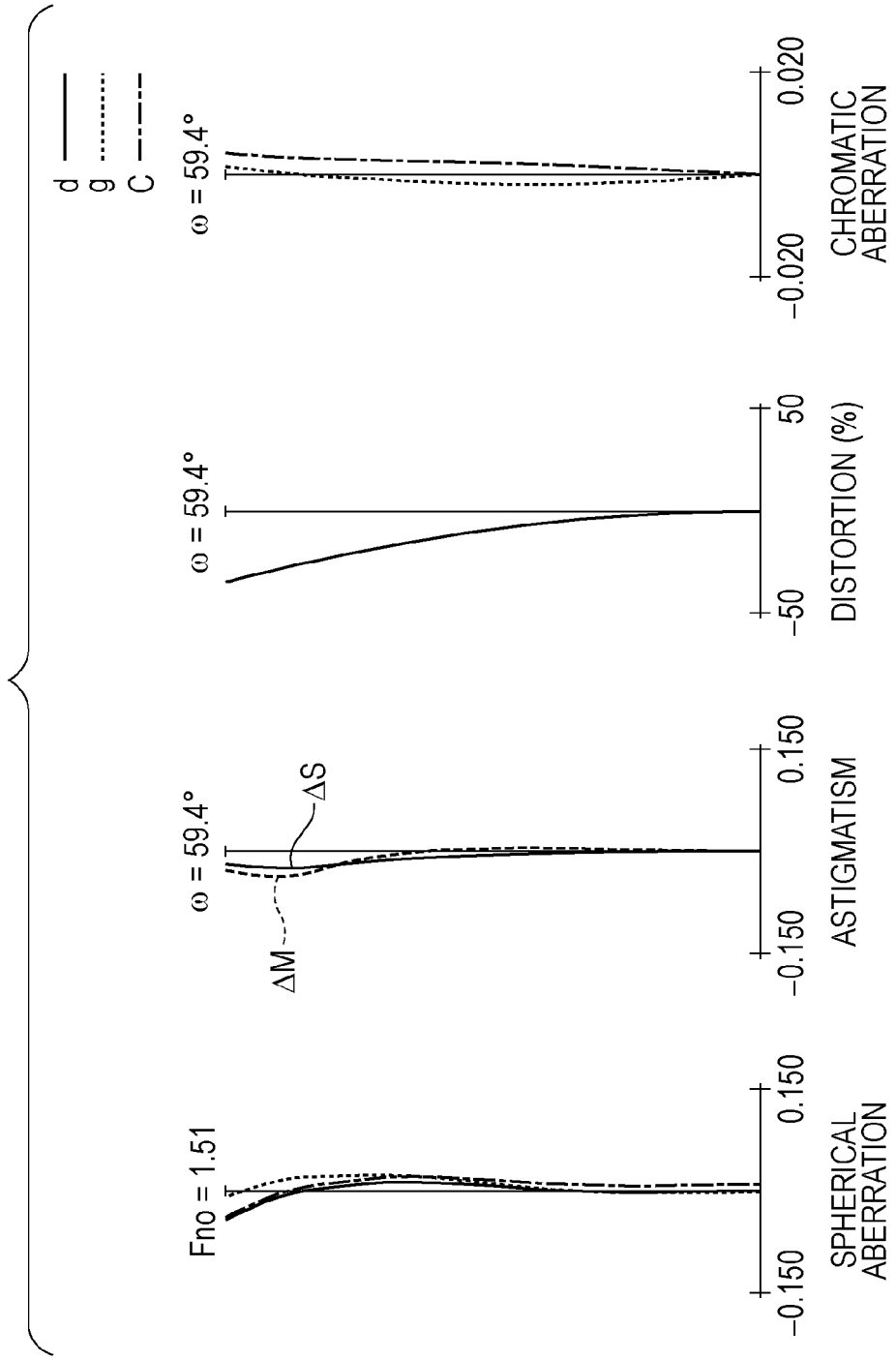
Figure 6B:
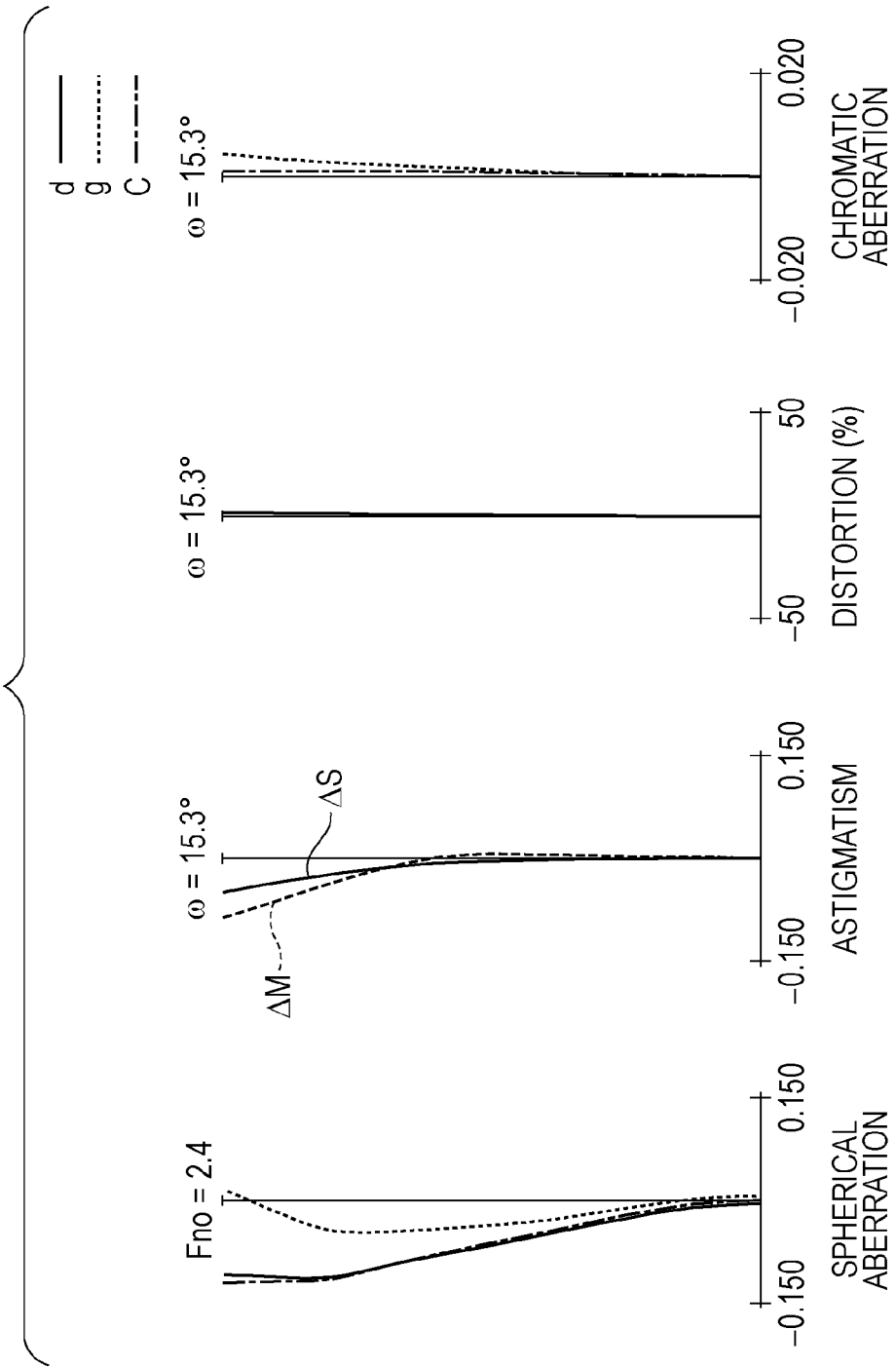
Figure 7:
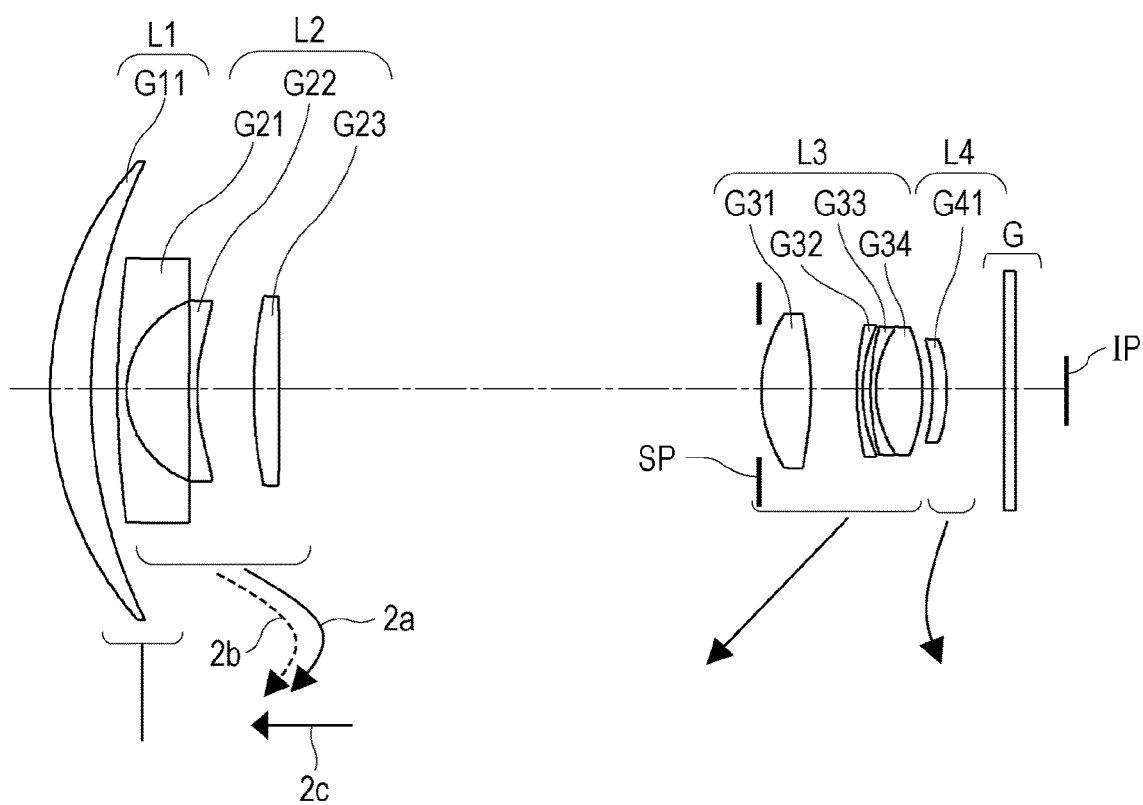
FIG. 7 is a lens sectional view at a wide angle end of a zoom lens according to a fourth exemplary embodiment.
Figure 8C:
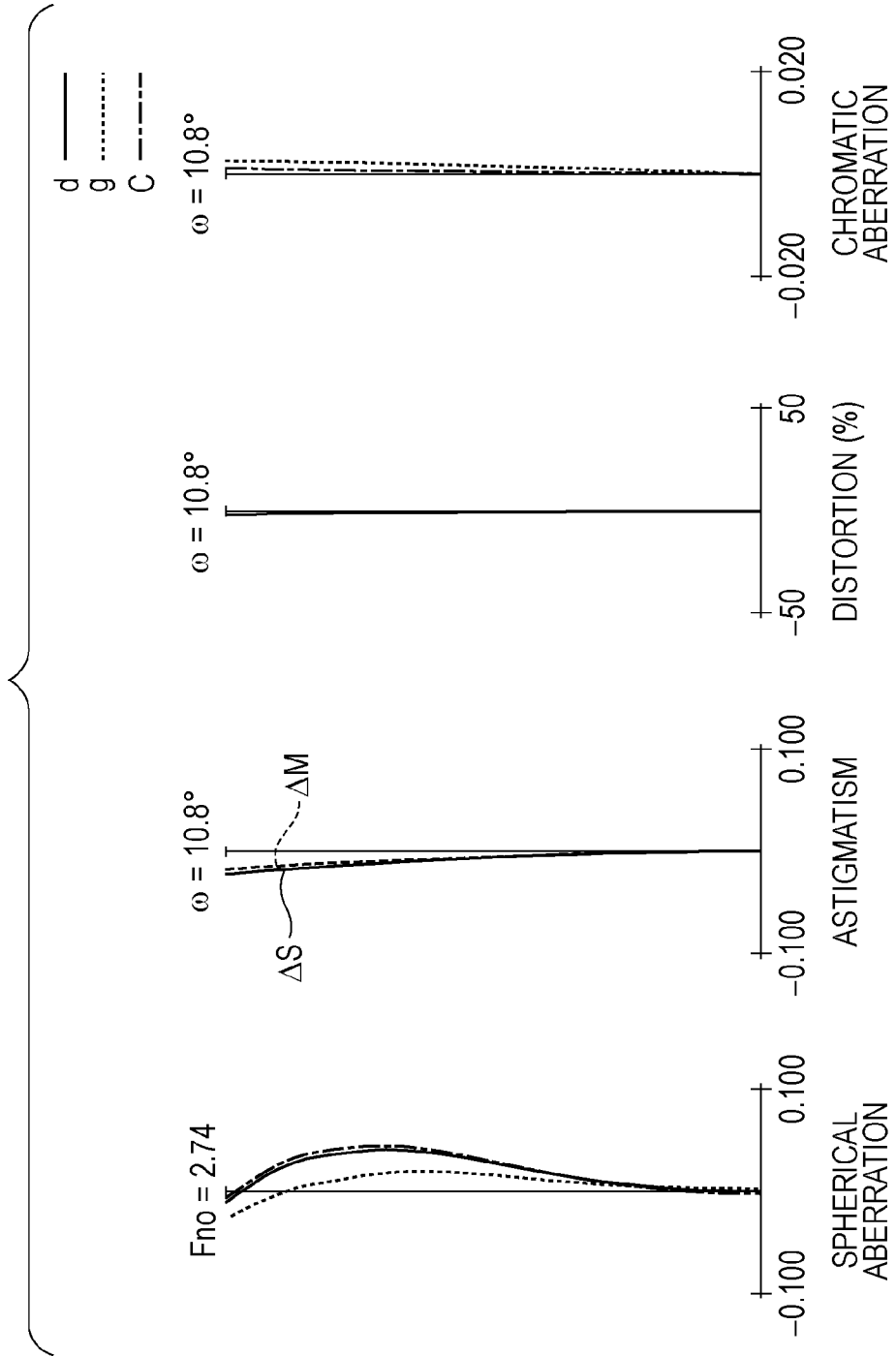

FIG. 5 is a lens sectional view at a wide angle end of a zoom lens according to a third exemplary embodiment. FIGS. 6A, 6B, and 6C are aberration diagrams, respectively, at a wide angle end, an intermediate zoom position, and a telephoto end of the zoom lens according to the third exemplary embodiment. The third exemplary embodiment provides a zoom lens having a zoom ratio of 8.2 and an F-number of approximately 1.51 to 3.99. FIG. 7 is a lens sectional view at a wide angle end of a zoom lens according to a fourth exemplary embodiment. FIGS. 8A, 8B, and 8C are aberration diagrams, respectively, at a wide angle end, an intermediate zoom position, and a telephoto end of the zoom lens according to the fourth exemplary embodiment. The fourth exemplary embodiment provides a zoom lens having a zoom ratio of 5.0 and an F-number of approximately 1.63 to 2.74.

Figure 9:
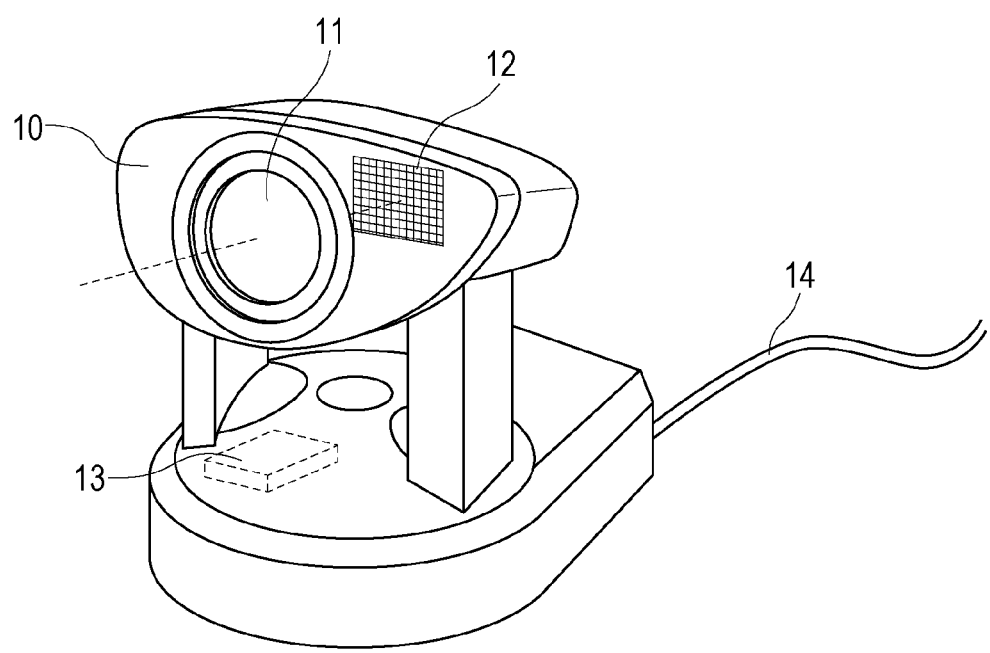
FIG. 9 is a schematic diagram of a primary portion of an image pickup apparatus according to an exemplary embodiment of the present disclosure.

FIG. 9 is a schematic diagram of a primary portion of a monitoring camera (image pickup apparatus) including a zoom lens according to an exemplary embodiment of the present disclosure. The zoom lens in each of the exemplary embodiments is an image pickup lens system to be used in an image pickup apparatus, such as a digital still camera, a video camera, a monitoring camera, or a broadcasting camera. In each lens sectional view, the left side corresponds to the object side, and the right side corresponds to the image side. In addition, in each lens sectional view, when i represents the order of a given lens unit counted from the object side to the image side, Li represents an ith lens unit.

The zoom lens according to the first, second, and fourth exemplary embodiments consists of a first lens unit L1 having a positive refractive power, a second lens unit L2 having a negative refractive power, a third lens unit L3 having a positive refractive power, and a fourth lens unit L4 having a positive refractive power. The first, second, and fourth exemplary embodiments provide a four-unit zoom lens of a positive lead type that consists of four lens units.

The zoom lens according to the third exemplary embodiment consists of a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The third exemplary embodiment provides a five-unit zoom lens of a positive lead type that consists of five lens units.

In each of the exemplary embodiments, the reference character SP denotes an aperture stop. In each of the exemplary embodiments, the aperture stop SP is disposed between the second lens unit L2 and the third lens unit L3 and moves along a trajectory identical to the trajectory of the third lens unit L3 when zooming. With this configuration, the structure of a lens barrel holding the zoom lens can be simplified.

The reference character G denotes an optical block corresponding to an optical filter, a face plate, a low pass filter, an infrared cut-off filter, or the like. The reference character IP denotes an image plane. When the zoom lens is used as an image pickup optical system of a video camera or a monitoring camera, the image plane IP corresponds to a solid-state image pickup element (photoelectric conversion element), such as a charge-coupled device (CCD) sensor or a complementary metal-oxide semiconductor (CMOS) sensor. When the zoom lens is used as an image pickup optical system of a silver-halide film camera, the image plane IP corresponds to the film surface.

In the aberration diagrams, Fno corresponds to the F-number, and spherical aberrations with respect to the C line (wavelength of 656.3 nm), the d line (wavelength of 587.6 nm), and the g line (wavelength of 435.8 nm) are indicated. In the aberration diagrams, ΔS represents a sagittal image plane, and ΔM represents a meridional image plane. The distortion aberration is indicated for the d line. In the chromatic aberration diagram, the chromatic aberrations for the C line and the g line are indicated. The symbol ω corresponds to an image pickup half angle of view.

In each of the exemplary embodiments, the lens units move as indicated by the arrows in the lens sectional view when zooming from the wide angle end to the telephoto end, and the distance between the adjacent lens units changes. Specifically, in each of the exemplary embodiments, the first lens unit L1 is stationary when zooming from the wide angle end to the telephoto end. The second lens unit L2 moves along a trajectory that projects toward the image side. In other words, the second lens unit L2 moves toward the image side and then moves toward the object side when zooming from the wide angle end to the telephoto end. The third lens unit L3 monotonously moves toward the object side. The fourth lens unit L4 moves so as to be located closer to the image side at the telephoto end than at the wide angle end. In addition, in the zoom lens according to the third exemplary embodiment, the fifth lens unit L5 is stationary when zooming.

In the zoom lens according to each of the exemplary embodiments, the distance between the first lens unit L1 and the second lens unit L2 is greater at the telephoto end than at the wide angle end, and the distance between the second lens unit L2 and the third lens unit L3 is smaller at the telephoto end than at the wide angle end. With this configuration, the power of the zoom lens can be increased efficiently. In addition, the distance between the third lens unit L3 and the fourth lens unit L4 is greater at the telephoto end than at the wide angle end. In the zoom lens according to the third exemplary embodiment, the distance between the fourth lens unit L4 and the fifth lens unit L5 is smaller at the telephoto end than at the wide angle end.

In addition, in the zoom lens according to each of the exemplary embodiments, the second lens unit L2 serves as a focusing unit. When the zoom lens is focused from an object at infinity to an object at close range at the telephoto end, the second lens unit L2 is let out toward the object side as indicated by the arrow 2c in the lens sectional view. The solid line 2a and the dotted line 2b in the lens sectional view indicate the movement loci for correcting a variation of the image plane associated with zooming from the wide angle end to the telephoto end when the object at infinity and the object at close range, respectively, are brought into focus.

In addition, in the zoom lens according to each of the exemplary embodiments, a given lens unit or a given lens is moved so as to have a component in a direction perpendicular to the optical axis, and thus an image blur can be corrected.

In each of the exemplary embodiments, when the focal length of the second lens unit L2 is represented by f2, the focal length of the third lens unit L3 is represented by f3, and the focal length of the entire system of the zoom lens at the wide angle end is represented by fw, the following conditional expressions (1) and (2) are satisfied.

$$-1.05 < f2/f3 < -0.30 \tag{1}$$

$$-5.00 < f2/fw < -2.50 \tag{2}$$

The conditional expression (1) defines the ratio between the focal length f2 of the second lens unit L2 and the focal length f3 of the third lens unit L3. When the focal length f3 of the third lens unit L3 is increased so that the ratio exceeds the upper limit value of the conditional expression (1), the refractive power of the third lens unit L3 becomes too low. As a result, the amount of movement of the third lens unit L3 when zooming needs to be increased for a higher power, which leads to an increase in the size of the zoom lens in the optical axis direction, and this is not preferable. When the focal length f3 of the third lens unit L3 is reduced so that the ratio falls below the lower limit value of the conditional expression (1), the refractive power of the third lens unit L3 becomes too high. As a result, a large amount of spherical aberration occurs, and this is not preferable.

The conditional expression (2) defines the ratio between the focal length f2 of the second lens unit L2 and the focal length fw of the entire system of the zoom lens at the wide angle end. When the focal length f2 of the second lens unit L2 is reduced so that the ratio exceeds the upper limit value of the conditional expression (2), the refractive power of the second lens unit L2 becomes too high. As a result, a large amount of curvature of field or chromatic aberration occurs in the entire zoom range, and this is not preferable. When the focal length f2 of the second lens unit L2 is increased so that the ratio falls below the lower limit value of the conditional expression (2), the refractive power of the second lens unit L2 becomes too low. As a result, it becomes difficult to increase the angle of view of the entire system of the zoom lens. Furthermore, the diameter of the first lens unit L1 increases, and this is not preferable.

As described thus far, in each of the exemplary embodiments, the components are configured as appropriate so as to satisfy the conditional expressions (1) and (2). With this configuration, a zoom lens that is small in size, has a wide angle of view, has a high zoom ratio, and has high optical performance can be obtained.

It is to be noted that, in each of the exemplary embodiments, preferably, the numerical ranges of the conditional expressions (1) and (2) are set as follows.

$$-0.95 < f2/f3 < -0.40 \quad (1a)$$

$$-4.50 < f2/fw < -2.70 \quad (2a)$$

More preferably, the numerical ranges of the conditional expressions (1) and (2) are set as follows.

$$-0.80 < f2/f3 < -0.50 \quad (1b)$$

$$-3.50 < f2/fw < -2.80 \quad (2b)$$

Furthermore, in each of the exemplary embodiments, it is more preferable that one or more of the following conditional expressions be satisfied.

$$1.80 < Nd2n < 2.30 \quad (3)$$

$$-35.0 < f1/f2 < -8.0 \quad (4)$$

$$0.30 < f3/M3 < 1.50 \quad (5)$$

$$-0.30 < (R1-R2)/(R1+R2) < -0.05 \quad (6)$$

$$0.20 < [(bfw+bft)/2]/\sqrt{(fw \times ft)} < 1.60 \quad (7)$$

$$0.02 < f3/f4 < 0.95 \quad (8)$$

$$0.70 < f31/f3 < 1.80 \quad (9)$$

$$28.0 < v3p - v3n < 65.0 \quad (10)$$

Here, the mean value of the refractive indices of the materials of two negative lenses disposed successively from the side closest to the object side in the second lens unit L2 is represented by Nd2n, the focal length of the first lens unit L1 is represented by f1, the focal length of the fourth lens unit L4 is represented by f4, and the focal length of the entire system of the zoom lens at the telephoto end is represented by ft. In addition, the amount of movement of the third lens unit L3 when zooming from the wide angle end to the telephoto end is represented by M3, the back focus of the zoom lens at the wide angle end is represented by bfw, and the back focus of the zoom lens at the telephoto end is represented by bft. Furthermore, the focal length of the positive lens disposed closest to the object side in the third lens unit L3 is represented by f31, the Abbe number of the material of a positive lens constituting a cemented lens component included in the third lens unit L3 is represented by v3p, and the Abbe number of the material of a negative lens constituting the cemented lens component is represented by v3n. In addition, the radius of curvature of a lens surface located closest to the object side in the first lens unit L1 is represented by R1, and the radius of curvature of a lens surface located closest to the image side is represented by R2. The refractive index corresponds to the refractive index with respect to the d line (587.6 nm).

The back focus is the distance from a lens surface closest to the image side to the image side in the zoom lens expressed in terms of the air-equivalent length. The Abbe number vd is a numerical value expressed by vd=(Nd−1)/(NF−NC), in which the refractive indices of the materials with respect to the F line (486.1 nm), the C line (656.3 nm), and the d line (587.6 nm) are represented by NF, NC, and Nd, respectively.

The amount of movement is a difference in the position along the optical axis of each lens unit at between the wide angle end and the telephoto end, and the sign of the amount of movement is positive when a given lens unit is located closer to the object side at the telephoto end than at the wide angle end or is negative when a given lens unit is located closer to the image side at the telephoto end than at the wide angle end.

The conditional expression (3) defines the mean value Nd2n of the refractive indices of the materials of two negative lenses disposed successively from the side closest to the object side in the second lens unit L2. When the mean value Nd2n of the refractive indices is increased so as to exceed the upper limit value of the conditional expression (3), a large amount of curvature of field or chromatic aberration occurs in the entire zoom range, and this is not preferable. When the mean value Nd2n of the refractive indices is reduced so as to fall below the lower limit value of the conditional expression (3), the radius of curvature of the lens surface of the negative lens included in the second lens unit L2 needs to be reduced in order to achieve a wide angle of view. As a result, a large amount of curvature of field or chromatic aberration occurs in the entire zoom range, and this is not preferable.

The conditional expression (4) defines the ratio between the focal length f1 of the first lens unit L1 and the focal length f2 of the second lens unit L2. When the focal length f1 of the first lens unit L1 is reduced so that the ratio exceeds the upper limit value of the conditional expression (4), the refractive power of the first lens unit L1 becomes too high. As a result, a large amount of magnification chromatic aberration occurs, and this is not preferable. When the focal length f1 of the first lens unit L1 is increased so that the ratio falls below the lower limit value of the conditional expression (4), the refractive power of the first lens unit L1 becomes too low. As a result, the effective diameter of the first lens unit L1 increases, and this is not preferable.

The conditional expression (5) defines the ratio between the amount of movement M3 of the third lens unit L3 when zooming from the wide angle end to the telephoto end and the focal length f3 of the third lens unit L3. When the amount of movement M3 of the third lens unit L3 is reduced so that the ratio exceeds the upper limit value of the conditional expression (5), the refractive power of the third lens unit L3 becomes low, and the magnification varying burden of the third lens unit L3 is thus reduced. As a result, it becomes difficult to increase the power of the entire system of the zoom lens, and this is not preferable. When the focal length f3 of the third lens unit L3 is reduced so that the ratio falls below the lower limit value of the conditional expression (5), the refractive power of the third lens unit L3 becomes too high. As a result, a large amount of spherical aberration occurs, and this is not preferable.

The conditional expression (6) defines the lens shape of a lens element constituting the first lens unit L1. Here, a lens element refers to a single lens or a cemented lens component in which two lenses are cemented. The conditional expression (6) specifies the shape of a lens element constituting the first lens unit L1 in terms of the radius of curvature R1 of the lens surface located closest to the object side in the first lens unit L1 and the radius of curvature R2 of the lens surface closest to the image side.

When the ratio exceeds the upper limit value of the conditional expression (6), the radius of curvature of the lens surface included in the first lens unit L1 becomes large, and the effective diameter needs to be increased in order to achieve a wide angle of view. As a result, the zoom lens is increased in size in the radial direction, and this is not preferable. When the ratio falls below the lower limit value of the conditional expression (6), the radius of curvature R1 of the lens surface located closest to the object side in the first lens unit L1 becomes small, and the refractive power of the lens surface located closest to the object side in the first lens unit L1 becomes too high. As a result, a large amount of astigmatism or curvature of field occurs, and this is not preferable.

The conditional expression (7) defines the back focus of the zoom lens. When the back focus bfw at the wide angle end or the back focus bft at the telephoto end is increased so as to exceed the upper limit value of the conditional expression (7), the image pickup apparatus is increased in size when the zoom lens is applied to the image pickup apparatus, and this is not preferable. When the back focus bfw at the wide angle end or the back focus bft at the telephoto end is reduced so as to fall below the lower limit value of the conditional expression (7), it becomes difficult to secure space for disposing an optical block, such as a low pass filter or an infrared cut-off filter, and this is not preferable.

The conditional expression (8) defines the ratio between the focal length f3 of the third lens unit L3 and the focal length f4 of the fourth lens unit L4. When the focal length f3 of the third lens unit L3 is increased so that the ratio exceeds the upper limit value of the conditional expression (8), the refractive power of the third lens unit L3 becomes too low. As a result, the magnification varying burden of the third lens unit L3 becomes small, and it becomes difficult to increase the power of the entire system of the zoom lens, and this is not preferable. When the focal length f3 of the third lens unit L3 is reduced so that the ratio falls below the lower limit value of the conditional expression (8), the refractive power of the third lens unit L3 becomes too high. As a result, a large amount of spherical aberration or coma aberration occurs, and this is not preferable.

The conditional expression (9) defines the ratio between the focal length f31 of a positive lens G31 disposed closest to the object side in the third lens unit L3 and the focal length f3 of the third lens unit L3. When the focal length f31 of the positive lens G31 disposed closest to the object side in the third lens unit L3 is increased so that the ratio exceeds the upper limit value of the conditional expression (9), the refractive power of the positive lens G31 becomes too low. As a result, it becomes difficult to correct spherical aberration at a sufficient level, and this is not preferable. When the focal length f31 of the positive lens G31 disposed closest to the object side in the third lens unit L3 is reduced so that the ratio falls below the lower limit value of the conditional expression (9), the refractive power of the positive lens G31 becomes too high. As a result, spherical aberration is overcorrected, and this is not preferable.

The conditional expression (10) defines the relation between the Abbe number ν3p of the material of a positive lens constituting a cemented lens component included in the third lens unit L3 and the Abbe number ν3n of the material of a negative lens constituting the cemented lens component included in the third lens unit L3. When the relation exceeds the upper limit value of the conditional expression (10), on-axis chromatic aberration is overcorrected, and this is not preferable. When the relation falls below the lower limit value of the conditional expression (10), it becomes difficult to correct on-axis chromatic aberration at a sufficient level, and this is not preferable.

Preferably, the numerical ranges of the conditional expressions (3) through (10) are set as follows.

$$1.83 < Nd2n < 2.10 \tag{3a}$$

$$-28.0 < f1/f2 < -10.0 \tag{4a}$$

$$0.40 < f3/M3 < 1.30 \tag{5a}$$

$$-0.25 < (R1-R2)/(R1+R2) < -0.06 \tag{6a}$$

$$0.40 < [(bfw+bft)/2]/\sqrt{(fw \times ft)} < 1.40 \tag{7a}$$

$$0.03 < f3/f4 < 0.85 \tag{8a}$$

$$0.80 < f31/f3 < 1.50 \tag{9a}$$

$$38.0 < \nu 3p - \nu 3n < 60.0 \tag{10a}$$

More preferably, the numerical ranges of the conditional expressions (3) through (10) are set as follows.

$$1.84 < Nd2n < 2.00 \tag{3b}$$

$$-25.0 < f1/f2 < -12.0 \tag{4b}$$

$$0.50 < f3/M3 < 1.20 \tag{5b}$$

$$-0.22 < (R1-R2)/(R1+R2) < -0.07 \tag{6b}$$

$$0.50 < [(bfw+bft)/2]/\sqrt{(fw \times ft)} < 1.20 \tag{7b}$$

$$0.04 < f3/f4 < 0.55 \tag{8b}$$

$$0.90 < f31/f3 < 1.20 \tag{9b}$$

$$48.0 < \nu 3p - \nu 3n < 55.0 \tag{10b}$$

Furthermore, when a zoom lens according to an exemplary embodiment of the present disclosure is applied to an image pickup apparatus including an image pickup element that receives an image formed by the zoom lens, it is preferable that the following conditional expression (11) be satisfied.

$$0.50 < (\tan \omega W/\tan \omega T)/(\beta 3t/\beta 3w) < 1.70 \quad (11)$$

In the above, ωW represents the half angle of view at the wide angle end, ωT represents the half angle of view at the telephoto end, β3w represents the lateral magnification of the third lens unit L3 at the wide angle end, and β3t represents the lateral magnification of the third lens unit L3 at the telephoto end.

When the half angle of view ωW at the wide angle end is increased so that the ratio exceeds the upper limit value of the conditional expression (11), a large amount of distortion aberration occurs at the wide angle end, and this is not preferable. When the ratio falls below the lower limit value of the conditional expression (11), the amount of change in the focal length when zooming from the wide angle end to the telephoto end is reduced, which makes it difficult to achieve a zoom lens having a high power, and this is not preferable.

In each of the exemplary embodiments, preferably, the numerical range of the conditional expression (11) is set as follows.

$$0.60 < (\tan \omega W/\tan \omega T)/(\beta 3t/\beta 3w) < 1.50 \quad (11a)$$

More preferably, the numerical range of the conditional expression (11) is set as follows.

$$0.70 < (\tan \omega W/\tan \omega T)/(\beta 3t/\beta 3w) < 1.20 \quad (11b)$$

Next, the configuration of each lens unit will be described. In the zoom lens according to each of the exemplary embodiments, the first lens unit L1 consists of a positive lens G11 having a meniscus shape that projects toward the object side. As the positive lens G11 has a meniscus shape, the effective diameter can be reduced.

In the zoom lens according to the first through third exemplary embodiments, the second lens unit L2 consists of a negative lens G21, a negative lens G22, a negative lens G23, and a positive lens G24 that are arranged in order from the object side to the image side. In the zoom lens according to the fourth exemplary embodiment, the second lens unit L2 consists of a negative lens G21, a negative lens G22, and a positive lens G23 that are arranged in order from the object side to the image side. As a plurality of negative lenses are disposed in the second lens unit L2, the negative refractive power can be divided thereamong, and astigmatism or curvature of field can be reduced.

In the zoom lens according to the first exemplary embodiment, the negative lens G21 is a negative lens having a meniscus shape that projects toward the object side, and the negative lens G22 is a negative lens having a meniscus shape that projects toward the object side. In addition, the negative lens G23 is a negative lens having a biconcave shape, and the positive lens G24 is a positive lens having a biconvex shape. In the zoom lens according to the second exemplary embodiment, the negative lens G21 is a negative lens having a meniscus shape that projects toward the object side, and the negative lens G22 is a negative lens having a meniscus shape that projects toward the object side. In addition, the negative lens G23 is a negative lens having a biconcave shape, and the positive lens G24 is a positive lens having a meniscus shape that projects toward the object side.

In the zoom lens according to the third exemplary embodiment, the negative lens G21 is a negative lens having a meniscus shape that projects toward the object side, and the negative lens G22 is a negative lens having a meniscus shape that projects toward the object side. In addition, the negative lens G23 is a negative lens having a biconcave shape, and the positive lens G24 is a positive lens having a biconvex shape. In the zoom lens according to the fourth exemplary embodiment, the negative lens G21 is a negative lens having a meniscus shape that projects toward the object side, and the negative lens G22 is a negative lens having a meniscus shape that projects toward the object side. The positive lens G23 is a positive lens having a biconvex shape.

In the zoom lens according to the first through third exemplary embodiments, the third lens unit L3 consists of a positive lens G31, a negative lens G32, a positive lens G33, a negative lens G34, and a positive lens G35 that are arranged in order from the object side to the image side. The negative lens G34 and the positive lens G35 are cemented. In the zoom lens according to the fourth exemplary embodiment, the third lens unit L3 consists of a positive lens G31, a negative lens G32, a negative lens G33, and a positive lens G34 that are arranged in order from the object side to the image side. The negative lens G33 and the positive lens G34 are cemented. In each of the exemplary embodiments, by disposing two or more positive lenses and two or more negative lenses in the third lens unit L3, chromatic aberration can be corrected favorably in the third lens unit L3.

In the zoom lens according to the first through third exemplary embodiments, the positive lens G31 is a positive lens having a biconvex shape, the negative lens G32 is a negative lens having a meniscus shape that projects toward the object side, and the positive lens G33 is a positive lens having a meniscus shape that projects toward the object side. The negative lens G34 is a negative lens having a meniscus shape that projects toward the object side, and the positive lens G35 is a positive lens having a biconvex shape. In the zoom lens according to the fourth exemplary embodiment, the positive lens G31 is a positive lens having a biconvex shape, and the negative lens G32 is a negative lens having a meniscus shape that projects toward the object side. The negative lens G33 is a negative lens having a meniscus shape that projects toward the object side, and the positive lens G34 is a positive lens having a biconvex shape.

In the zoom lens according to each of the exemplary embodiments, the fourth lens unit L4 consists of a positive lens G41 having a meniscus shape that projects toward the image side. In the zoom lens according to the third exemplary embodiment, the fifth lens unit L5 consists of a positive lens G51 having a meniscus shape that projects toward the image side.

Next, lens data of first through fourth numerical examples corresponding, respectively, to the first through fourth exemplary embodiments of the present disclosure will be presented. In each of the numerical examples, i represents the order of a given optical surface counted from the object side. In addition, ri represents the radius of curvature of an ith optical surface (ith surface), di represents the distance between an ith surface and an i+1th surface, ndi and νdi represent the refractive index and the Abbe number, respectively, of the material of an ith optical member with respect to the d line.

Furthermore, when K represents the eccentricity, A4, A6, A8, and A10 represent aspherical coefficients, and the displacement in the optical axis direction at the position of a height h from the optical axis is represented by x with the surface vertex serving as a reference, the aspherical shape is expressed by $x = (h^2/r)/\{1+[1-(1+K)(h/r)^2]^{1/2}\} + A4h^4 + A6h^6 + A8h^8 + A10h^{10}$.

Here, r is the radius of paraxial curvature. In addition, the expression e−Z means $10^{-Z}$.

In each of the exemplary embodiments, the back focus (BF) is the distance from a surface closest to the image side in a lens system to the image side expressed in terms of the air-equivalent length. In addition, the correspondence between the numerical examples and the conditional expressions described above is indicated in Table 1.

It is to be noted that the effective image diameter (diameter of an image circle) at the wide angle end can be made smaller than the effective image diameter at the telephoto end. This is because the barrel distortion aberration that is likely to occur at the wide angle side can be corrected by enlarging an image through image processing.

First Numerical Example unit: mm surface data

| surface number | r | d | nd | vd |
|---|---|---|---|---|
| 1 | 37.228 | 3.90 | 1.69680 | 55.5 |
| 2 | 53.229 | (variable) | | |
| 3 | 27.502 | 0.80 | 2.00100 | 29.1 |
| 4 | 10.716 | 5.80 | | |
| 5 | 52.184 | 0.70 | 1.88300 | 40.8 |
| 6 | 11.629 | 4.88 | | |
| 7 | −23.408 | 0.70 | 1.59522 | 67.7 |
| 8 | 31.045 | 0.56 | | |
| 9 | 26.34 | 3.80 | 2.10300 | 18.1 |
| 10 | −490.072 | (variable) | | |
| 11 (aperture stop) | ∞ | 0.31 | | |
| 12* | 9.069 | 4.43 | 1.49710 | 81.6 |
| 13* | −32.38 | 1.00 | | |
| 14 | 10.055 | 1.00 | 1.90366 | 31.3 |
| 15 | 6.505 | 1.09 | | |
| 16 | 7.156 | 1.51 | 1.90043 | 37.4 |
| 17 | 11.844 | 0.73 | | |
| 18 | 20.71 | 0.50 | 2.00100 | 29.1 |
| 19 | 6.095 | 2.72 | 1.49700 | 81.5 |
| 20 | −19.85 | (variable) | | |
| 21* | −9.39 | 2.27 | 1.88202 | 37.2 |
| 22* | −7.996 | (variable) | | |
| 23 | ∞ | 1.00 | 1.51633 | 64.1 |
| image plane | ∞ | | | | aspherical surface data

12th surface

K = 0.00000e+000 A 4 = −1.01039e−004 A 6 = −1.29808e−006
A 8 = 1.31431e−008 A10 = −1.96751e−010

13th surface

K = 0.00000e+000 A 4 = 1.34282e−004 A 6 = −1.37313e−006
A 8 = 3.87105e−008 A10 = −3.39226e−010

21st surface

K = 0.00000e+000 A 4 = −4.18242e−004 A 6 = 2.39785e−005
A 8 = −1.25243e−006 A10 = 4.46407e−008

22nd surface

K = 0.00000e+000 A 4 = −5.28389e−005 A 6 = 1.91627e−005
A 8 = −9.14203e−007 A10 = 2.61457e−008 various pieces of data
zoom ratio 6.0

| | wide angle | intermediate | telephoto |
|---|---|---|---|
| focal length | 2.6 | 9.37 | 15.61 |
| F-number | 1.50 | 2.70 | 3.95 |
| half angle of view | 59 | 13.8 | 7.97 |
| image height | 3.2 | 3.2 | 3.2 |
| total lens length | 74.64 | 75.82 | 76.44 |
| BF (in air) distance | 6.76 | 5.58 | 4.96 |
| d 2 | 0.65 | 20.37 | 17.33 |
| d10 | 35.86 | 7.37 | 1.64 |
| d20 | 1.43 | 11.38 | 20.77 |
| d22 | 5.09 | 3.91 | 3.29 | lens unit data

| unit | starting surface | focal length |
|---|---|---|
| 1 | 1 | 161.6 |
| 2 | 3 | −7.9 |
| 3 | 12 | 13.6 |
| 4 | 21 | 34.6 |

Second Numerical Example unit: mm surface data

| surface number | r | d | nd | vd |
|---|---|---|---|---|
| 1 | 26.749 | 3.90 | 1.63854 | 55.4 |
| 2 | 33.767 | (variable) | | |
| 3 | 24.714 | 0.90 | 2.00100 | 29.1 |
| 4 | 11.533 | 5.54 | | |
| 5 | 32.064 | 0.70 | 1.88300 | 40.8 |
| 6 | 11.142 | 5.95 | | |
| 7 | −20.869 | 0.70 | 1.49700 | 81.5 |
| 8 | 53.368 | 0.15 | | |
| 9 | 27.321 | 2.25 | 1.95906 | 17.5 |
| 10 | 578.026 | (variable) | | |
| 11 (aperture stop) | ∞ | 0.15 | | |
| 12* | 9.995 | 3.89 | 1.49710 | 81.6 |
| 13* | −27.095 | 0.15 | | |
| 14 | 9.127 | 0.50 | 1.69895 | 30.1 |
| 15 | 6.391 | 0.38 | | |
| 16 | 6.58 | 2.02 | 1.91082 | 35.3 |
| 17 | 8.358 | 1.16 | | |
| 18 | 17.803 | 0.45 | 2.00100 | 29.1 |
| 19 | 5.574 | 2.79 | 1.49700 | 81.5 |
| 20 | −24.123 | (variable) | | |
| 21* | −9.858 | 2.70 | 1.85135 | 40.1 |
| 22* | −8.589 | (variable) | | |
| 23 | ∞ | 1.20 | 1.51633 | 64.1 |
| image plane | ∞ | | | | aspherical surface data

12th surface

K = 0.00000e+000 A 4 = −6.67470e−005 A 6 = −1.10112e−006
A 8 = 2.62703e−008 A10 = −4.90138e−010

13th surface

K = 0.00000e+000 A 4 = 1.21543e−004 A 6 = −8.85126e−007
A 8 = 2.27660e−008 A10 = −3.99041e−010

21st surface

K = 0.00000e+000 A 4 = −1.66928e−004 A 6 = 7.24031e−006
A 8 = −2.20615e−007 A10 = 1.04619e−008

22nd surface

K = 0.00000e+000 A 4 = 9.89242e−005 A 6 = 3.96707e−006
A 8 = −8.34099e−008 A10 = 3.58727e−009 unit: mm various pieces of data
zoom ratio 7.7

|  | wide angle | intermediate | telephoto |
|---|---|---|---|
| focal length | 2.95 | 12.99 | 22.72 |
| F-number | 1.44 | 2.60 | 3.99 |
| half angle of view | 59 | 13.8 | 7.97 |
| image height | 3.2 | 3.2 | 3.2 |
| total lens length | 77.74 | 77.21 | 79.50 |
| BF (in air) distance | 6.80 | 7.33 | 5.04 |
| d 2 | 0.8 | 25.53 | 20.82 |
| d10 | 41.2 | 6.43 | 1.1 |
| d20 | 1.45 | 10.96 | 23.29 |
| d22 | 3.2 | 3.73 | 1.44 | lens unit data

| unit | starting surface | focal length |
|---|---|---|
| 1 | 1 | 165.7 |
| 2 | 3 | −9.5 |
| 3 | 12 | 13.4 |
| 4 | 21 | 39.6 |

Third Numerical Example unit: mm

| surface number | r | d | nd | νd |
|---|---|---|---|---|
| 1 | 25.293 | 3.90 | 1.63854 | 55.4 |
| 2 | 29.828 | (variable) | | |
| 3 | 26.303 | 0.80 | 2.00100 | 29.1 |
| 4 | 9.864 | 6.14 | | |
| 5 | 564.528 | 0.70 | 1.88300 | 40.8 |
| 6 | 19.687 | 3.65 | | |
| 7 | −21.141 | 0.70 | 1.49700 | 81.5 |
| 8 | 39.568 | 0.15 | | |
| 9 | 28.677 | 3.17 | 1.95906 | 17.5 |
| 10 | −245.532 | (variable) | | |
| 11 (aperture stop) | ∞ | 0.15 | | |
| 12* | 10.789 | 4.43 | 1.49710 | 81.6 |
| 13* | −26.68 | 0.15 | | |
| 14 | 12.741 | 0.50 | 1.65412 | 39.7 |
| 15 | 7.808 | 0.47 | | |
| 16 | 7.818 | 1.95 | 1.91082 | 35.3 |
| 17 | 12.648 | 0.97 | | |
| 18 | 21.413 | 0.45 | 2.00100 | 29.1 |
| 19 | 6.194 | 3.77 | 1.49700 | 81.5 |
| 20 | −28.064 | (variable) | | |
| 21* | −9.729 | 3.00 | 1.69350 | 53.2 |
| 22* | −10.45 | (variable) | | |
| 23 | −14.742 | 1.15 | 1.49700 | 81.5 |
| 24 | −8.92 | 1.00 | | |
| 25 | ∞ | 1.20 | 1.51633 | 64.1 |
| image plane | ∞ | | | | aspherical surface data

12th surface

K = 0.00000e+000 A 4 = −6.61378e−005 A 6 = −1.41031e−006
A 8 = 3.40820e−008 A10 = −5.71142e−010

13th surface

K = 0.00000e+000 A 4 = 9.02773e−005 A 6 = −1.13400e−006
A 8 = 3.03683e−008 A10 = −5.20683e−010 unit: mm

21st surface

K = 0.00000e+000 A 4 = 6.40599e−004 A 6 = 7.69572e−006
A 8 = 2.55381e−007 A10 = −1.66126e−008

22nd surface

K = 0.00000e+000 A 4 = 8.54693e−004 A 6 = 3.92456e−006
A 8 = 4.26617e−007 A10 = −1.39766e−008 various pieces of data
zoom ratio 8.2

|  | wide angle | intermediate | telephoto |
|---|---|---|---|
| focal length | 2.91 | 11.57 | 23.71 |
| F-number | 1.51 | 2.40 | 3.99 |
| half angle of view | 59.4 | 15.3 | 7.46 |
| image height | 3.2 | 3.2 | 3.2 |
| total lens length | 82.99 | 82.99 | 82.99 |
| BF (air) distance | 5.44 | 5.44 | 5.44 |
| d 2 | 1.71 | 24.84 | 15.52 |
| d10 | 41.79 | 8.44 | 1.1 |
| d20 | 1.36 | 11.6 | 29.48 |
| d22 | 1.95 | 1.91 | 0.7 | lens unit data

| unit | starting surface | focal length |
|---|---|---|
| 1 | 1 | 195.1 |
| 2 | 3 | −8.6 |
| 3 | 12 | 14.0 |
| 4 | 21 | 288.8 |
| 5 | 23 | 42.7 |

Fourth Numerical Example unit: mm surface data

| surface number | r | d | nd | νd |
|---|---|---|---|---|
| 1 | 30.67 | 3.59 | 1.60311 | 60.6 |
| 2 | 45.789 | (variable) | | |
| 3 | 89.124 | 0.8 | 1.83481 | 42.7 |
| 4 | 8.445 | 5.53 | | |
| 5* | 163.974 | 0.7 | 1.85135 | 40.1 |
| 6* | 15.592 | 5 | | |
| 7 | 39.701 | 2.36 | 1.95906 | 17.5 |
| 8 | −457.019 | (variable) | | |
| 9 (aperture stop) | ∞ | 0.15 | | |
| 10* | 11.467 | 4.43 | 1.49710 | 81.6 |
| 11* | −25.123 | 4.1 | | |
| 12 | 26.291 | 0.5 | 1.80000 | 29.8 |
| 13 | 13.8 | 0.7 | | |
| 14 | 20.804 | 0.5 | 2.00100 | 29.1 |
| 15 | 9.968 | 4.11 | 1.49700 | 81.5 |
| 16 | −14.292 | (variable) | | |
| 17* | −21.937 | 1.3 | 1.63550 | 23.9 |
| 18* | −16.526 | (variable) | | |
| 19 | ∞ | 1 | 1.51633 | 64.1 |
| image plane | ∞ | | | | aspherical surface data

5th surface

K = 0.00000e+000 A 4 = −1.12076e−004 A 6 = 1.12315e−006
A 8 = 1.85307e−008 A10 = −3.48953e−010

-continued unit: mm

6th surface

K = 0.00000e+000 A 4 = −2.24407e−004 A 6 = 9.25849e−007
A 8 = 1.34631e−008 A10 = −4.17400e−010

10th surface

K = 0.00000e+000 A 4 = −8.74987e−005 A 6 = −3.36254e−007
A 8 = 8.48107e−009 A10 = −2.19956e−010

11th surface

K = 0.00000e+000 A 4 = 1.10666e−004 A 6 = −3.45787e−007
A 8 = 7.52257e−009 A10 = −2.002336−010

17th surface

K = 0.00000e+000 A 4 = −3.38502e−004 A 6 = 8.93494e−008
A 8 = 9.15286e−008 A10 = −3.69530e−009

18th surface

K = 0.00000e+000 A 4 = −3.03991e−004 A 6 = 9.55362e−007
A 8 = 5.04255e−008 A10 = −2.62495e−009 various pieces of data
zoom ratio 5.0

|  | wide angle | intermediate | telephoto |
| --- | --- | --- | --- |
| focal length | 3.2 | 10.2 | 16.11 |
| F-number | 1.63 | 2.11 | 2.74 |
| half angle of view | 59.4 | 15.3 | 7.46 |
| image height | 3.04 | 3.04 | 3.04 |
| total lens length | 79.41 | 76.55 | 83.27 |
| BF (air) distance | 10.22 | 13.09 | 6.37 |
| d 2 | 2.36 | 28.21 | 27.21 |
| d 8 | 42.43 | 8.82 | 2.06 |
| d16 | 0.85 | 5.74 | 20.22 |
| d18 | 5.00 | 7.87 | 1.15 | lens unit data

| unit | starting surface | focal length |
| --- | --- | --- |
| 1 | 1 | 141.4 |
| 2 | 3 | −9.8 |
| 3 | 10 | 16.9 |
| 4 | 17 | 96.4 |

TABLE 1

| CONDITIONAL EXPRESSIONS | FIRST EXEMPLARY EMBODIMENT | SECOND EXEMPLARY EMBODIMENT | THIRD EXEMPLARY EMBODIMENT | FOURTH EXEMPLARY EMBODIMENT |
| --- | --- | --- | --- | --- |
| (1) f2/f3 | −0.58 | −0.71 | −0.62 | −0.58 |
| (2) f2/fw | −3.04 | −3.21 | −2.97 | −3.05 |
| (3) Nd2n | 1.942 | 1.942 | 1.942 | 1.843 |
| (4) f1/f2 | −20.46 | −17.50 | −22.60 | −14.50 |
| (5) f3/M3 | 0.77 | 0.67 | 0.52 | 1.09 |
| (6) (R1 − R2)/(R1 + R2) | −0.18 | −0.12 | −0.08 | −0.20 |
| (7) ((bfw + bft)/2)/ $\sqrt{(fw \times ft)}$ | 0.92 | 0.72 | 0.65 | 1.15 |
| (8) f3/f4 | 0.39 | 0.34 | 0.05 | 0.18 |
| (9) f31/f3 | 1.09 | 1.14 | 1.15 | 0.98 |
| (10) ν3p − ν3n | 52.4 | 52.4 | 52.4 | 52.4 |
| (11) (tanωW/tanωT)/ (β3t/β3w) | 1.12 | 0.91 | 0.83 | 1.19 |

Next, an exemplary embodiment of a monitoring camera (image pickup apparatus) that includes, as an image pickup optical system, a zoom lens according to an exemplary embodiment of the present disclosure will be described with reference to FIG. 9. Illustrated in FIG. 9 are a monitoring camera body 10 and an image pickup optical system 11 that is constituted by the zoom lens described in any one of the first through fourth exemplary embodiments. A solid-state image pickup element (photoelectric conversion element) 12 is embedded in the camera body and is constituted by a CCD sensor, a CMOS sensor, or the like that receives an object image formed by the image pickup optical system 11. A memory 13 stores information related to the object image that has been subjected to photoelectric conversion by the solid-state image pickup element 12. A network cable 14 is provided for transferring information stored in the memory 13.

In this manner, by applying a zoom lens according to an exemplary embodiment of the present disclosure in an image pickup apparatus, such as a monitoring camera, an image pickup apparatus that is small in size, has a wide angle of view, has a high zoom ratio, and has high optical performance can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-132146, filed Jun. 30, 2015, which is hereby incorporated by reference herein in its entirety.

What is claimed is:

1. A zoom lens, comprising:
a first lens unit having a positive refractive power;
a second lens unit having a negative refractive power;
a third lens unit having a positive refractive power; and
a fourth lens unit having a positive refractive power, the first through fourth lens units being arranged in order from an object side to an image side,
wherein a distance between adjacent lens units changes when zooming,
wherein, when zooming, the first lens unit is stationary,
wherein, when zooming from a wide angle end to a telephoto end, the second lens unit is configured to move toward the image side and then to move toward the object side, and the third lens unit is configured to move monotonously toward the object side,
wherein the second lens unit includes two or more negative lenses, and
wherein, when a focal length of the second lens unit is represented by f2, a focal length of the third lens unit is represented by f3, and a focal length of the zoom lens at the wide angle end is represented by fw, conditional expressions $-1.05<f2/f3<-0.30$ and $-5.00<f2/fw<-2.50$ are satisfied.

2. The zoom lens according to claim 1,
wherein the second lens unit includes two negative lenses disposed successively from a side closest to the object side, and
wherein, when a mean value of refractive indices of materials of the two negative lenses disposed successively from the side closest to the object side in the second lens unit is represented by Nd2n, a conditional expression $1.80<Nd2n<2.30$ is satisfied.

3. The zoom lens according to claim 1,
wherein, when a focal length of the first lens unit is represented by f1, a conditional expression $-35.0<f1/f2<-8.0$ is satisfied.

4. The zoom lens according to claim 1,
wherein, when an amount of movement of the third lens unit when zooming from the wide angle end to the telephoto end is represented by M3, a conditional expression $0.30<f3/M3<1.50$ is satisfied.

5. The zoom lens according to claim 1,
wherein the first lens unit consists of a single lens element, and
wherein, when a radius of curvature of a lens surface of the lens element closest to the object side is represented by R1 and a radius of curvature of a lens surface closest to the image side is represented by R2, a conditional expression $-0.30<(R1-R2)/(R1+R2)<-0.05$ is satisfied.

6. The zoom lens according to claim 1,
wherein, when a back focus of the zoom lens at the wide angle end is represented by bfw, a back focus of the zoom lens at the telephoto end is represented by bft, a focal length of the zoom lens at the wide angle end is represented by fw, and a focal length of the zoom lens at the telephoto end is represented by ft, a conditional expression $0.20<[(bfw+bft)/2]/\sqrt{(fw \times ft)}<1.60$ is satisfied.

7. The zoom lens according to claim 1,
wherein, when a focal length of the fourth lens unit is represented by f4, a conditional expression $0.02<f3/f4<0.95$ is satisfied.

8. The zoom lens according to claim 1,
wherein a positive lens is disposed closest to the object side in the third lens unit,
wherein the third lens unit includes a cemented lens component in which a positive lens and a negative lens are cemented, and
wherein, when a focal length of the positive lens disposed closest to the object side in the third lens unit is represented by f31, an Abbe number of a material of the positive lens included in the cemented lens component is represented by ν3p, and an Abbe number of a material of the negative lens included in the cemented lens component is represented by ν3n, conditional expressions $0.70<f31/f3<1.80$ and $28.0<\nu3p-\nu3n<65.0$ are satisfied.

9. The zoom lens according to claim 1,
wherein the zoom lens consists of the first lens unit having the positive refractive power, the second lens unit having the negative refractive power, the third lens unit having the positive refractive power, and the fourth lens unit having the positive refractive power.

10. The zoom lens according to claim 1,
wherein the zoom lens consists of the first lens unit having the positive refractive power, the second lens unit having the negative refractive power, the third lens unit having the positive refractive power, the fourth lens unit having the positive refractive power, and a fifth lens unit having a positive refractive power, the first through fifth lens units being arranged in order from the object side to the image side.

11. An image pickup apparatus, comprising:
a zoom lens; and
an image pickup element configured to receive an image formed by the zoom lens,
the zoom lens comprising, in order from an object side to an image side:
a first lens unit having a positive refractive power,
a second lens unit having a negative refractive power,
a third lens unit having a positive refractive power, and
a fourth lens unit having a positive refractive power,
wherein a distance between adjacent lens units changes when zooming,
wherein, when zooming, the first lens unit is stationary,
wherein, when zooming from a wide angle end to a telephoto end, the second lens unit is configured to move toward the image side and then to move toward the object side, and the third lens unit is configured to move monotonously toward the object side,
wherein the second lens unit includes two or more negative lenses, and
wherein, when a focal length of the second lens unit is represented by f2, a focal length of the third lens unit is represented by f3, and a focal length of the zoom lens at the wide angle end is represented by fw, conditional expressions $-1.05<f2/f3<-0.30$ and $-5.00<f2/fw<-2.50$ are satisfied.

12. The image pickup apparatus according to claim 11,
wherein, when a half angle of view at the wide angle end is represented by ωW, a half angle of view at the telephoto end is represented by ωT, a lateral magnification of the third lens unit at the wide angle end is represented by β3w, and a lateral magnification of the third lens unit at the telephoto end is represented by β3t, a conditional expression $0.50<(\tan \omega W/\tan \omega T)/(\beta 3t/\beta 3w)<1.70$ is satisfied.

* * * * *